United States Patent
Takeuchi et al.

(10) Patent No.: US 8,035,325 B2
(45) Date of Patent: Oct. 11, 2011

(54) SINGLE-PHASE BRUSHLESS MOTOR

(75) Inventors: Kesatoshi Takeuchi, Shioziri (JP); Mamoru Sugimoto, Chino (JP)

(73) Assignee: Seiko Epson Corporation (JP)

( * ) Notice: Subject to any disclaimer, the term of this patent is extended or adjusted under 35 U.S.C. 154(b) by 414 days.

(21) Appl. No.: 12/227,561

(22) PCT Filed: Aug. 17, 2007

(86) PCT No.: PCT/JP2007/066404
§ 371 (c)(1), (2), (4) Date: Nov. 21, 2008

(87) PCT Pub. No.: WO2008/023779
PCT Pub. Date: Feb. 28, 2008

(65) Prior Publication Data
US 2009/0179514 A1    Jul. 16, 2009

(30) Foreign Application Priority Data

| Aug. 21, 2006 | (JP) | 2006-224461 |
| Aug. 21, 2006 | (JP) | 2006-224470 |
| Dec. 6, 2006 | (JP) | 2006-328960 |
| Mar. 22, 2007 | (JP) | 2007-074858 |
| Mar. 22, 2007 | (JP) | 2007-074885 |
| May 15, 2007 | (JP) | 2007-129690 |

(51) Int. Cl.
*H02P 6/00* (2006.01)

(52) U.S. Cl. .................. 318/400.01; 318/727

(58) Field of Classification Search .......... 318/727, 318/400.01, 400.38, 774
See application file for complete search history.

(56) References Cited

U.S. PATENT DOCUMENTS

| 4,894,572 A | | 1/1990 | Shiraki | |
| 5,352,946 A | * | 10/1994 | Hoffman et al. | 310/12.32 |
| 6,072,251 A | * | 6/2000 | Markle | 310/12.05 |
| 6,265,793 B1 | * | 7/2001 | Korenaga | 310/12.06 |
| 6,316,849 B1 | * | 11/2001 | Konkola et al. | 310/12.06 |
| 6,770,987 B1 | * | 8/2004 | Sogard et al. | 310/12.24 |
| 2004/0130236 A1 | | 7/2004 | Yonekura | |
| 2004/0178757 A1 | | 9/2004 | Petersen | |
| 2005/0218849 A1 | | 10/2005 | Sanglikar et al. | |
| 2005/0280386 A1 | | 12/2005 | Brown | |
| 2005/0285471 A1 | | 12/2005 | Chen et al. | |

FOREIGN PATENT DOCUMENTS

| DE | 19546145 A1 | 6/1996 |
| JP | 54-054219 | 4/1979 |
| JP | 63-017572 | 2/1988 |

(Continued)

*Primary Examiner* — Rina Duda
(74) *Attorney, Agent, or Firm* — Harness, Dickey & Pierce, P.L.C.

(57) ABSTRACT

The single-phase brushless motor according to one aspect of the present invention includes a coil array having a plurality of magnetic coils 11-14; a magnet array having a plurality of permanent magnets 31-34; a magnetic sensor 40 for detecting relative position of the magnet array and the coil array; and a drive control circuit that, utilizing the output signal SSA of the magnetic sensor, generates application voltage for driving the coil array with a single-phase drive signal. The coil array includes a magnetic member 20. This magnetic member 20 is constituted such that, with the single-phase brushless motor at a stop, the centers of the permanent magnets 31-34 come to a stop at locations offsetted from the centers of the magnetic coils 11-14, due to attraction of the magnetic member 20 by the magnet array.

13 Claims, 32 Drawing Sheets

FOREIGN PATENT DOCUMENTS

| | | |
|---|---|---|
| JP | 63-17572 U | 2/1988 |
| JP | 07-213041 | 8/1995 |
| JP | 07-213041 A | 8/1995 |
| JP | 08-037787 A | 2/1996 |
| JP | 08-182364 A | 7/1996 |
| JP | 09-294389 A | 11/1997 |
| JP | 2001-186743 | 7/2001 |
| JP | 2001-186743 A | 7/2001 |
| JP | 2001-298982 A | 10/2001 |
| JP | 2005-312240 | 11/2005 |
| JP | 2005-323471 | 11/2005 |
| JP | 2006-136194 A | 5/2006 |
| WO | WO-03/084046 A | 10/2003 |
| WO | WO-03/105317 A | 12/2003 |

* cited by examiner

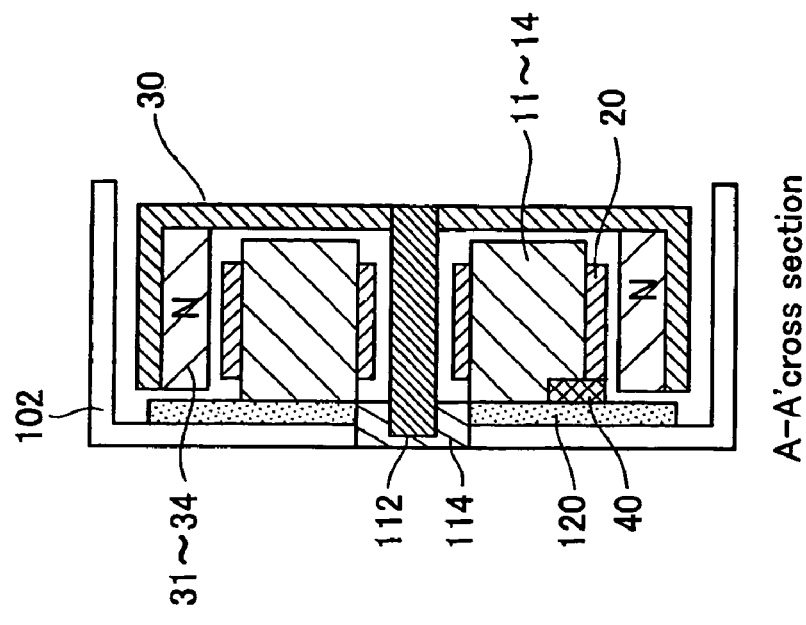
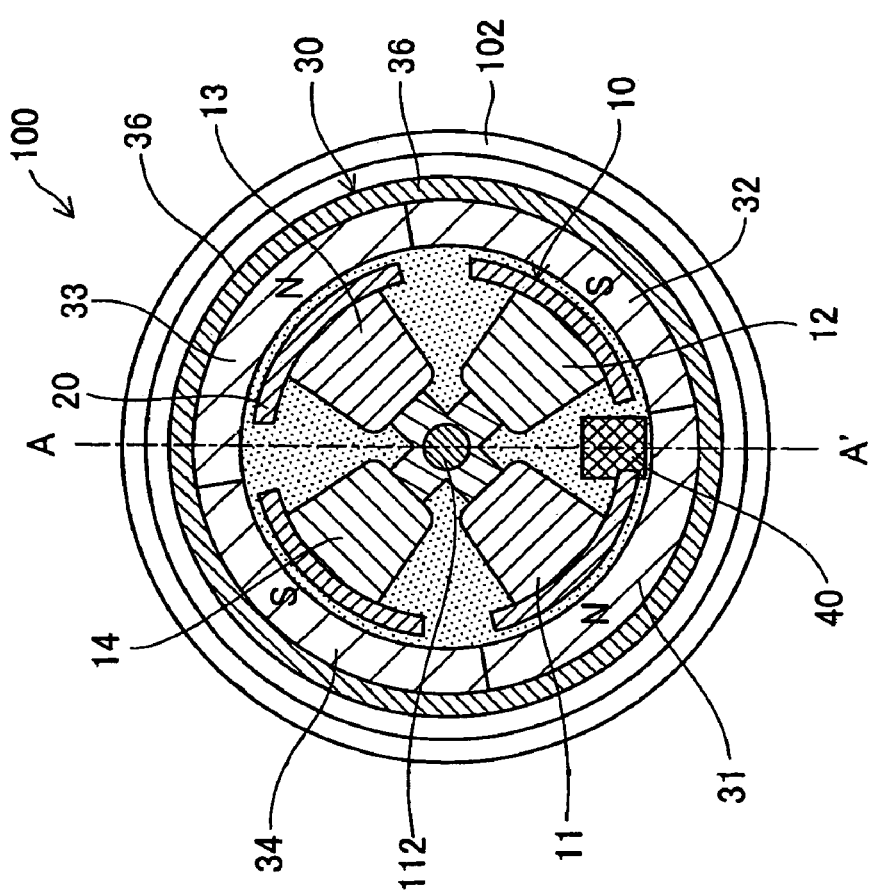
Fig.1B
Fig.1A

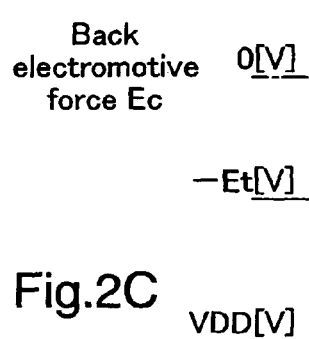
Fig.2A
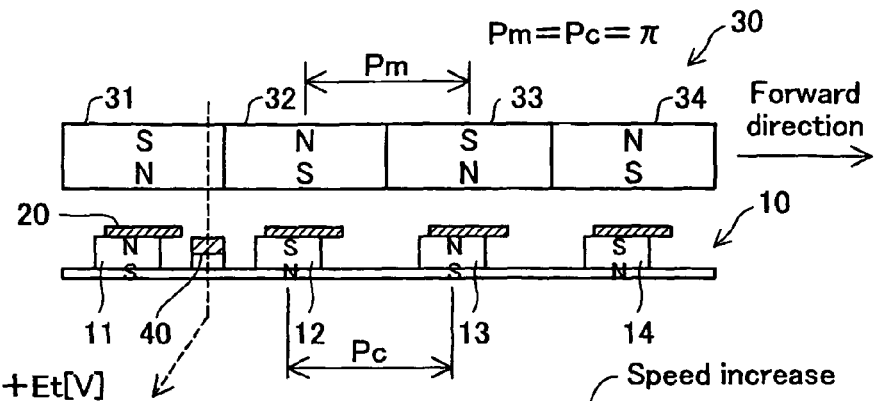
Fig.2B
Fig.2C

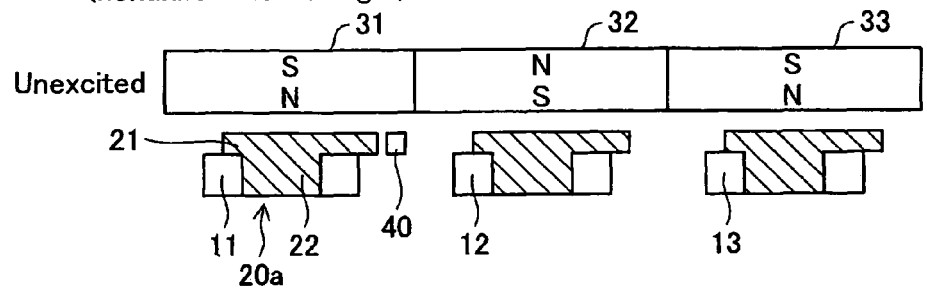
Fig.7A Magnetic yoke structure example 1 (nonuniform left to right)
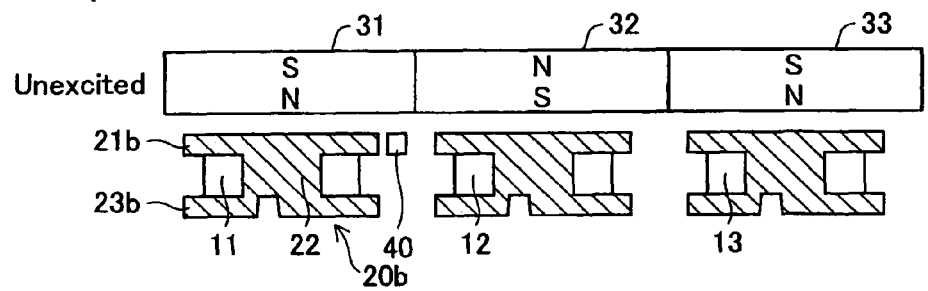
Fig.7B Magnetic yoke structure example 2 (nonuniform due to recession)
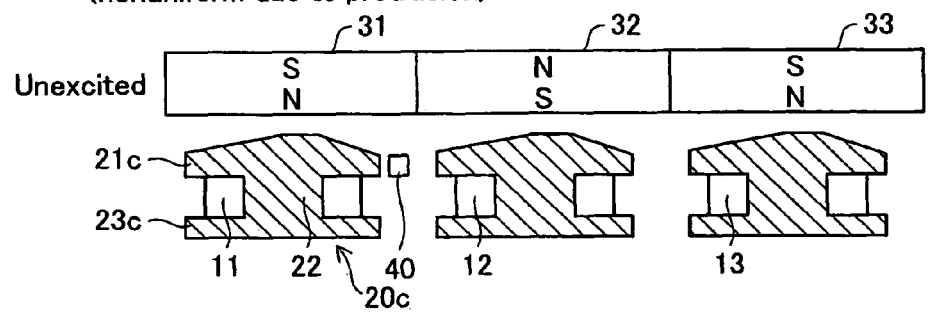
Fig.7C Magnetic yoke structure example 3 (nonuniform due to protrusion)
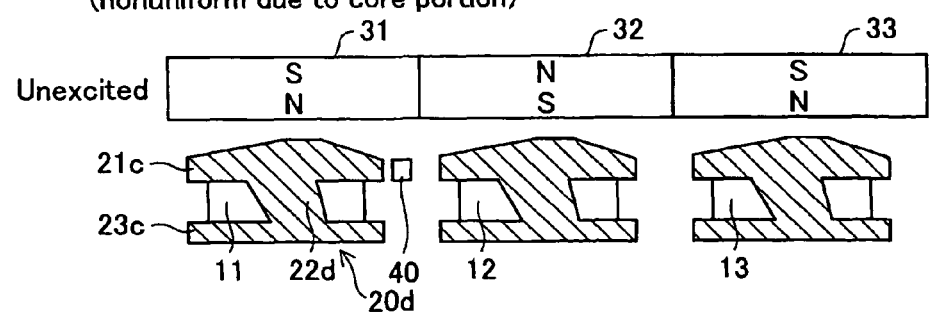
Fig.7D Magnetic yoke structure example 4 (nonuniform due to core portion)

Y = a·X + b
or
Y = a(X + b)

Operation of first bridge circuit 250a

Operation of second bridge circuit 250b 2-pole parallel winding 2-pole series winding 4-pole parallel winding 4-pole series winding Fig.12A
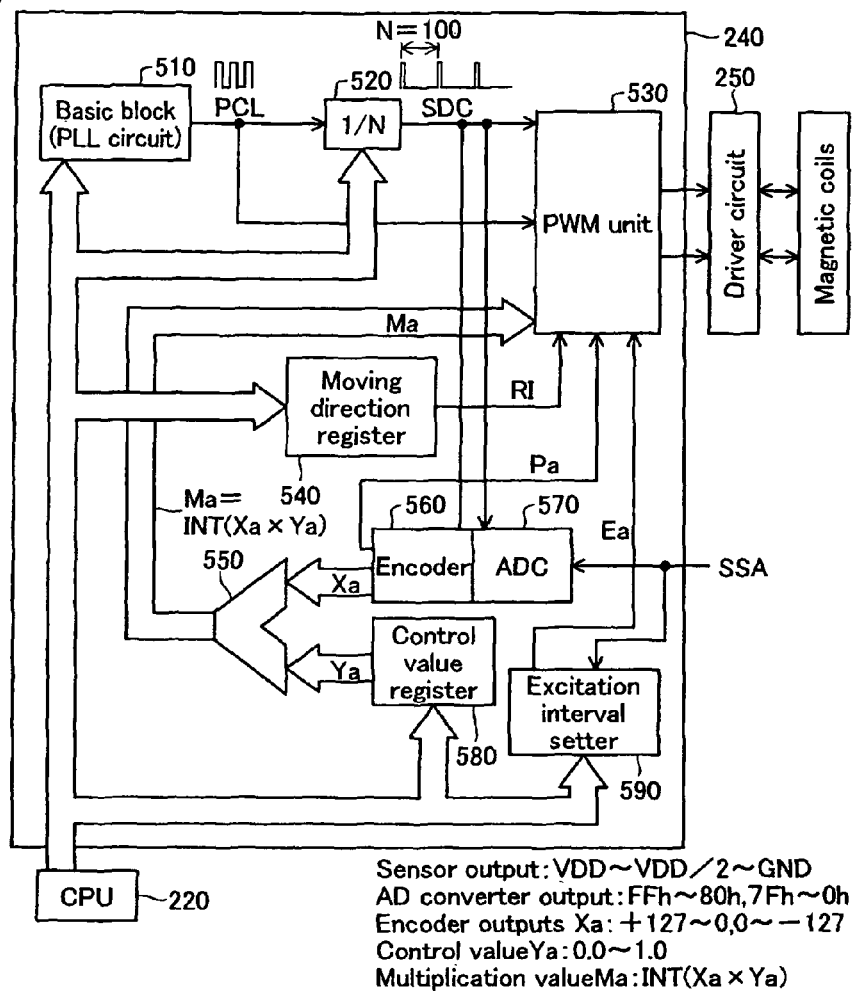
Fig.12B
Fig.12C
Fig.12D
Fig.12E
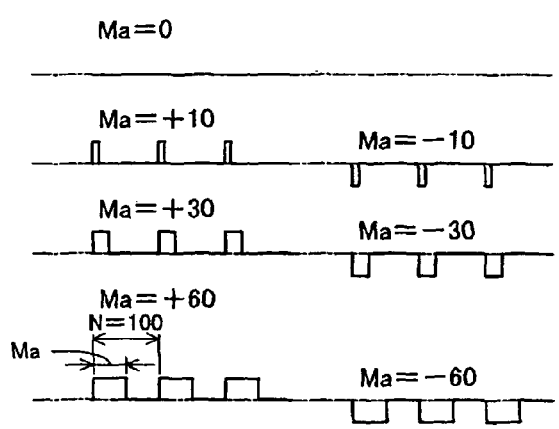

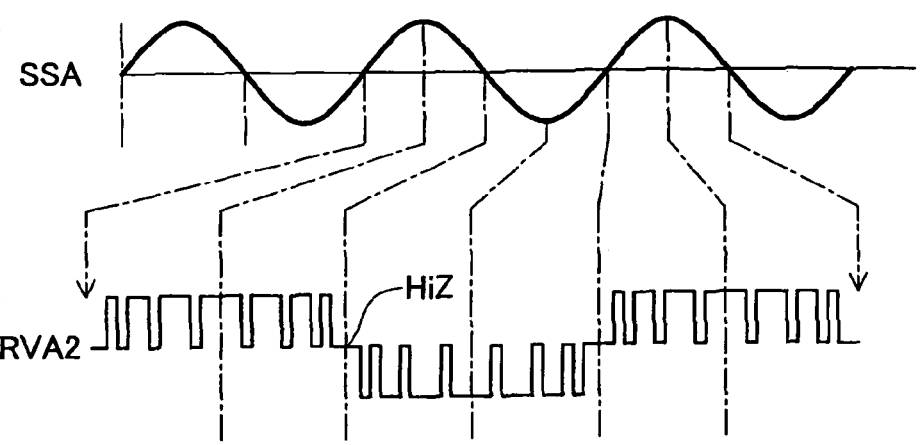
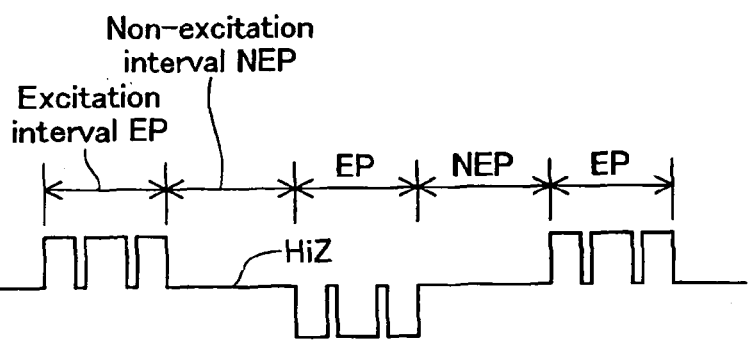

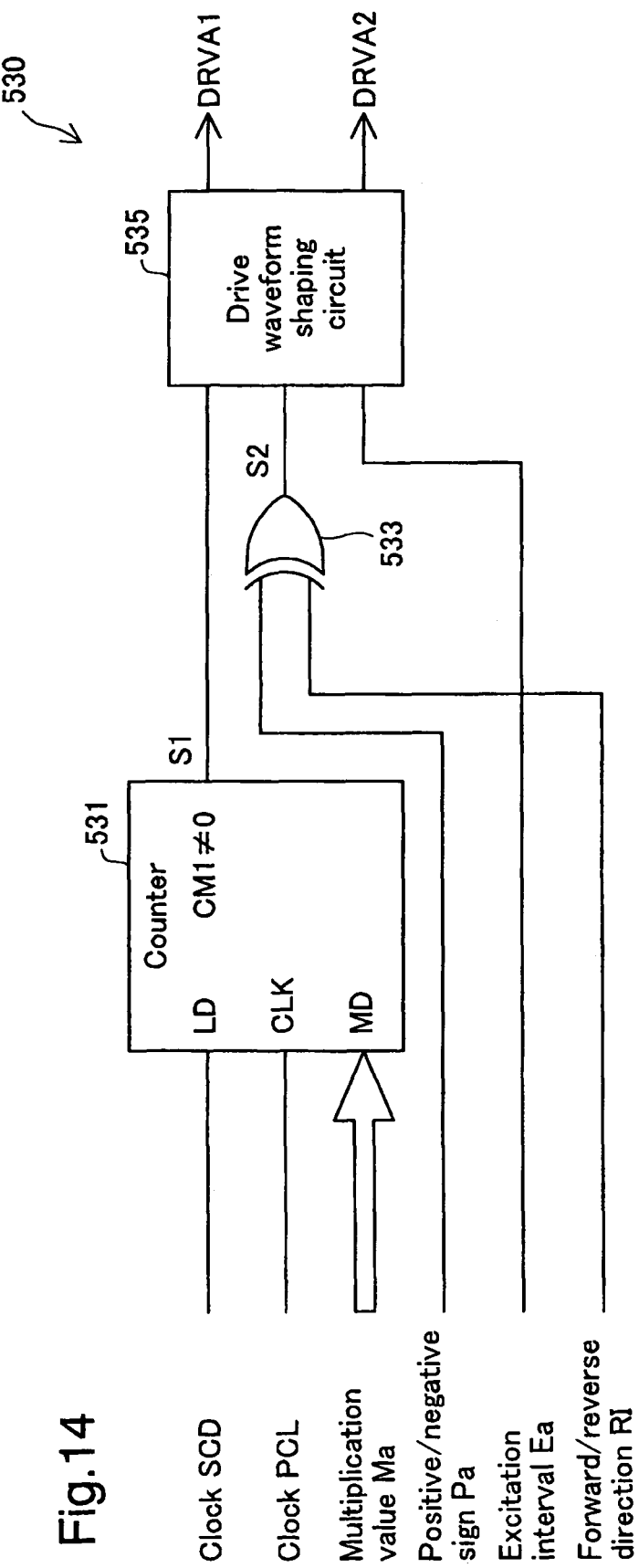

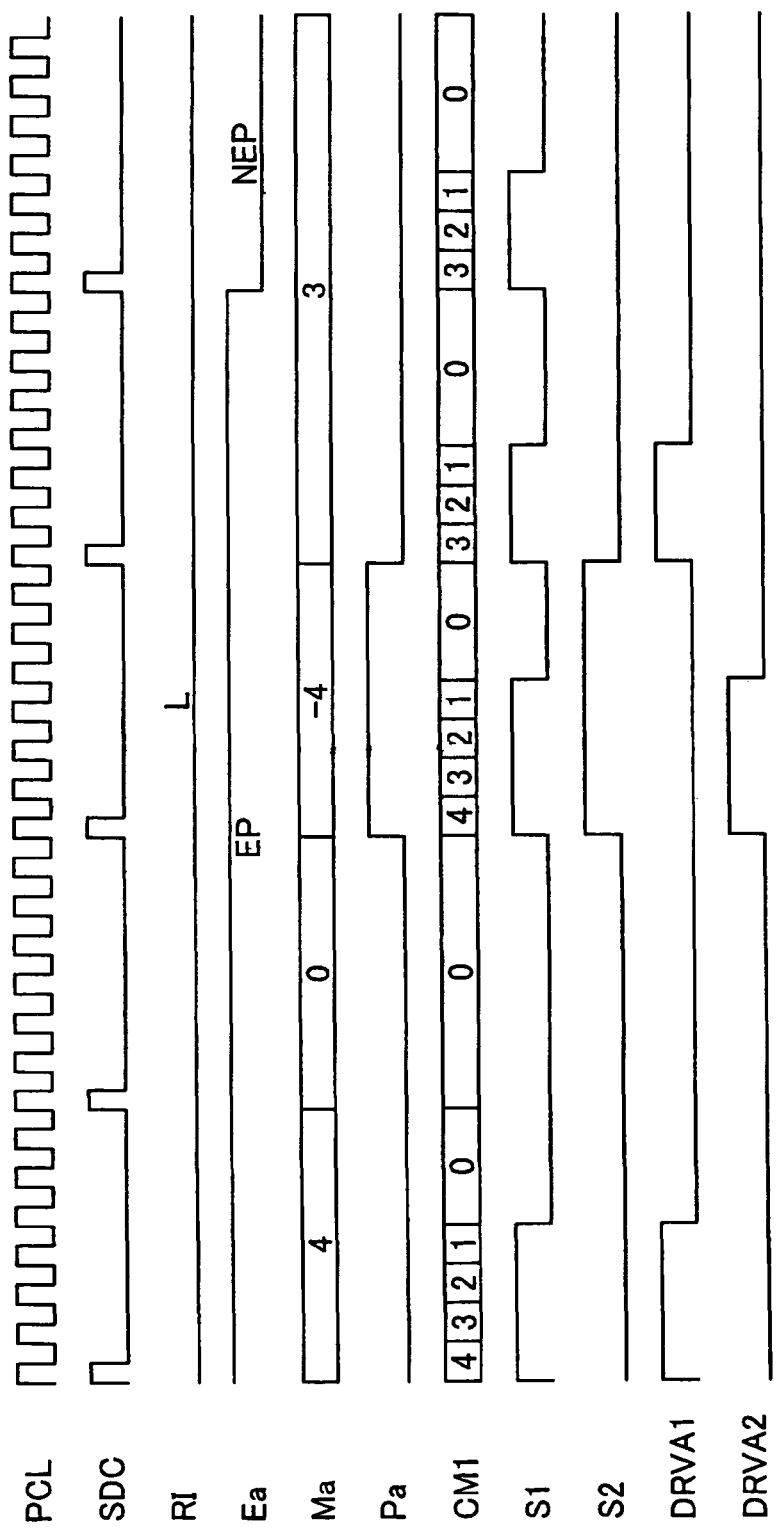

During reverse rotation (RI = "H")

Driving by rectangular wave

Current attenuates in association with increased speed

Driving by sine wave

Current attenuates in association with increased speed

Fig.19A
2-phase motor
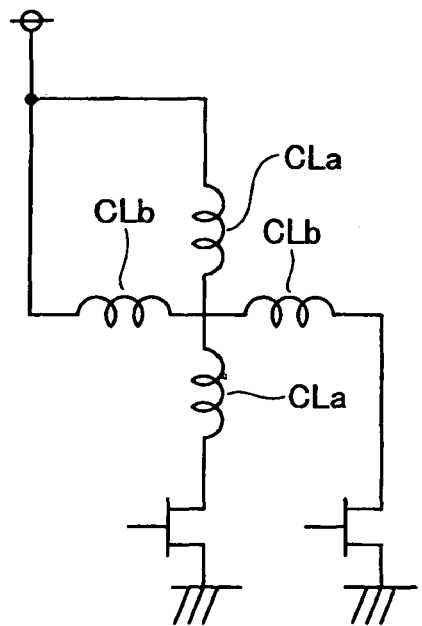
Fig.19B
1-phase motor
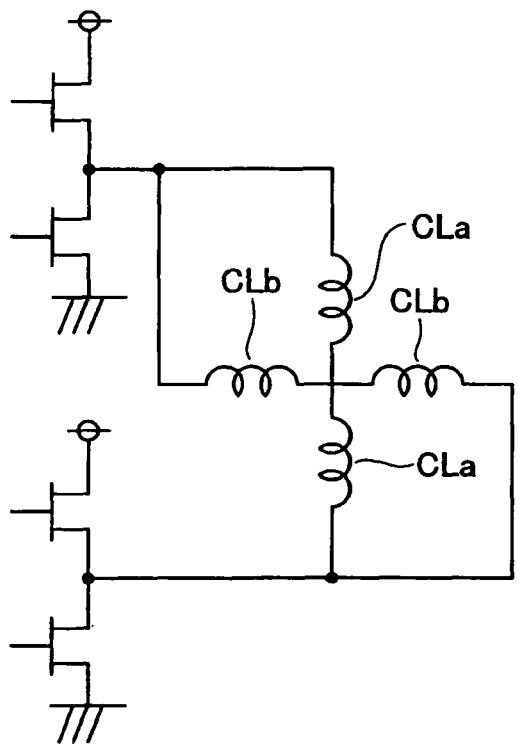
CLa 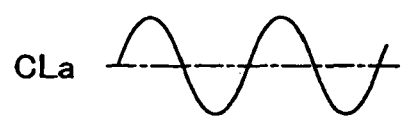
CLb 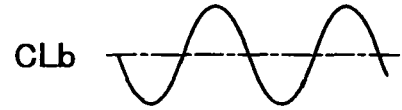

Fig.20

| Drive method | | Rectangular wave drive | | | Sine wave drive | | | |
|---|---|---|---|---|---|---|---|---|
| | Voltage [V] | Current [mA] | Power [W] | Speed [rpm] | Current [mA] | Power [W] | Speed [rpm] | Waveform efficiency [%] |
| 2-phase motor (conventional) | 12 | 300 | 3.60 | — | — | — | 3220 | — |
| 1-phase motor (embodiment) | 8 | 294 | 2.35 | 3250 | 250 | 2.00 | 3250 | 15.0 |

A-A' cross section

A-A' cross section

A-A' cross section

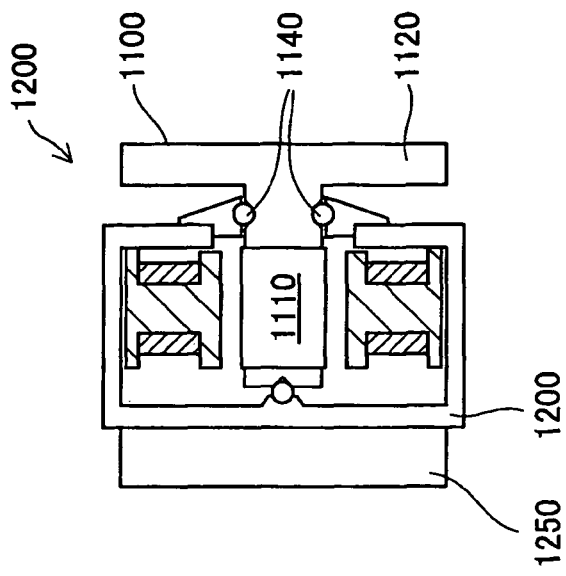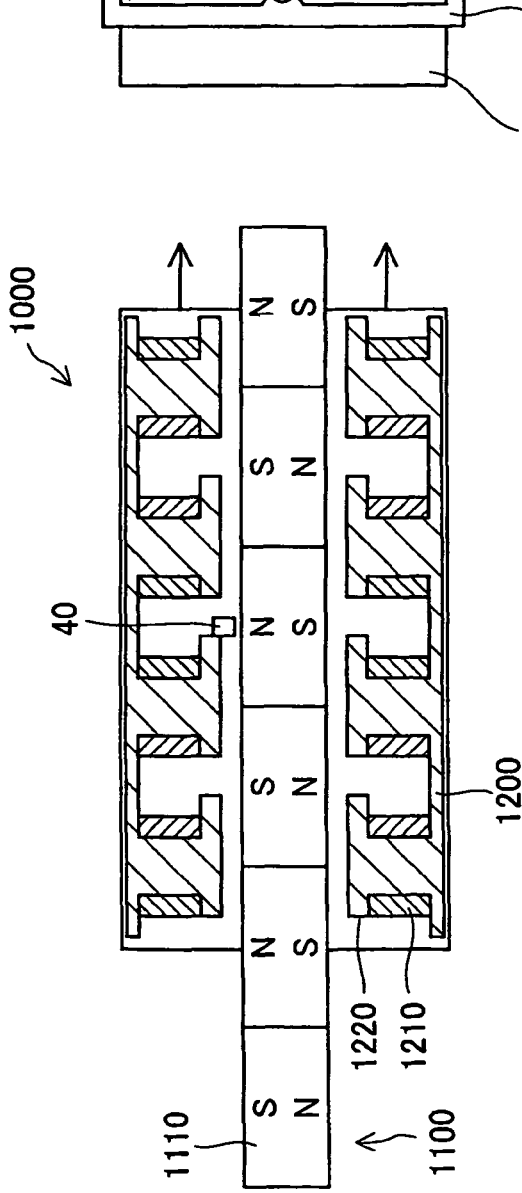
Fig.27A
Fig.27B

A-A' cross section

Position when nonexcited
$(\text{phase} = (n+\frac{1}{2})\pi)$

Stop/start (phase = π/2)    Pm=Pc=π

Phase = just before π (magnetization direction reverses at π)

Phase = just after π

Stop/start (phase = 3π/2)

SINGLE-PHASE BRUSHLESS MOTOR

TECHNICAL FIELD

The present invention relates to a single-phase brushless motor that utilizes permanent magnets and magnetic coils.

BACKGROUND ART

In the motor industry, both 1-phase motors and 2-phase motors are referred to collectively as "single-phase motors." However, the term single-phase motor will be used herein to mean phase 1 motors only, and excludes phase 2 motors.

Brushless motors that utilize permanent magnets and magnetic coils are known from publications such as JP 2001-298982A, for example.

In this prior art electric motor, control is carried out using an on/off signal from a digital magnetic sensor. Specifically, the timing for reversing the polarity of the voltage applied to the magnetic coils is determined using an on/off signal from the digital magnetic sensor. A three-phase drive signal is often used as the drive signal.

Conventional brushless motors utilized a drive signal with two or more phases; none use a single-phase drive signal. The reason is related to the startup characteristics of a single-phase motor which will be discussed below.

A characteristic of single-phase motors is that the motor cannot be started up with the permanent magnets and coils stopped in direct opposition to one another. This position is known as the "deadlock point" or "dead point." Thus, the startup method employed for an ordinary single-phase motor involves providing a secondary winding for the purpose of reliable startup, with current flowing to the secondary winding only during startup. In a certain type of single-phase motor, a capacitor is employed to differentiate the phases of the primary winding and the secondary winding.

In ordinary brushless motors on the other hand, a so-called inverter drive is employed. However, when a single-phase employing an inverter drive is started up, there is considerable current flow to the secondary winding and the capacitor during startup, creating the problem of susceptibility to damage of the switching elements or capacitor. Accordingly, a problem encountered in the prior art is the difficulty of configuring a single-phase motor as a brushless motor.

DISCLOSURE OF THE INVENTION

An object of the present invention is to provide technology relating to a single-phase brushless motor that does not have a deadlock point and the can be started up without a secondary winding.

According to one aspect of the present invention, a single-phase brushless motor, comprises: a coil array having a plurality of magnetic coils; a magnet array having a plurality of permanent magnets; a magnetic sensor for detecting relative position of the magnet array and the coil array; and a drive control circuit configured to, utilizing an output signal of the magnetic sensor, generates application voltage for driving the coil array with a single-phase drive signal. The coil array comprises a magnetic member. The magnetic member is constituted such that, with the single-phase brushless motor at a stop, centers of the permanent magnets come to a stop at locations offsetted from centers of the magnetic coils, due to attraction of the magnetic member by the magnet array.

According to this single-phase brushless motor, by attraction of the magnetic member to the magnet array with the single-phase brushless motor at a stop, the magnetic member arrangement provided to the coil array will function to bring the centers of the permanent magnets to a stop at locations offsetted with respect the centers of the magnetic coils, so that the stop position does not become a deadlock point. Consequently, startup without the aid of a secondary winding is possible.

In one embodiment, the magnetic member is provided for each of the magnetic coils, and at least part of each magnetic member is positioned between one of the magnetic coils and one of the permanent magnets with the single-phase brushless motor at a halt.

With this arrangement, since each magnetic coil is provided with the magnetic member, the coil array is easily imparted with balanced weight overall. Moreover, since the magnetic members are positioned at least partly between the magnetic coils and the permanent magnets, it is possible attain the desired stop position with relatively small volume of magnetic members.

In another embodiment, the magnetic member includes a core portion functioning as a core of the magnetic coil.

With this arrangement, it is possible to improve the magnetic flux density of the coils. Moreover, by engineering the shape of the core, it is possible to construct a motor that will come to a stop with the centers of the permanent magnets at locations offsetted with respect the centers of the magnetic coils.

In another embodiment, the magnetic sensor is a sensor that outputs the output signal exhibiting analog variation according to relative position of the magnet array and the coil array.

With this arrangement, the motor can be driven efficiently, utilizing analog variation of the magnetic sensor.

In another embodiment, the magnetic sensor is disposed at a location such that the output signal of the magnetic sensor is a signal having waveform similar to back electromotive force induced in the coil array by movement of the magnet array.

With this arrangement, the output signal of the magnetic sensor has a waveform similar to the induced voltage, and thus by using this output signal to drive the coil array, power consumption can be minimized, and the motor can be operated with minimal noise and vibration.

In another embodiment, the drive control circuit includes a PWM control circuit that generates the single-phase drive signal by executing PWM control utilizing the analog variation of the output signal of the magnetic sensor.

With this arrangement, the motor can be driven by a drive signal similar in shape to the back electromotive force waveform, and thus it is possible to improve motor efficiency.

In another embodiment, the drive control circuit includes an excitation interval setting unit that limits the single-phase drive signal such that, where position of polarity reversal in a waveform of the back electromotive force induced in the coil array through movement of the magnet array is designated as a $\pi$ phase point, voltage is applied to the coil array during excitation intervals symmetric about a $\pi/2$ phase point, and voltage is applied to the coil array during non-excitation intervals symmetric about the $\pi$ phase point of the waveform of the back electromotive force, and the excitation interval setting unit is able to vary division between the excitation intervals and the non-excitation intervals.

In proximity to the of $\pi$ phase point of the induced voltage waveform, driving force cannot be generated effectively despite application of voltage to the coil, and therefore noise and vibration will be produced, and motor efficiency will be lower. Accordingly, by limiting the single-phase drive signal in such a way that voltage is not applied to the coil array during non-excitation intervals symmetric about the $\pi$ phase point of the induced voltage waveform in the manner described above, it is possible to reduce noise and vibration, as well as to improve motor efficiency.

In another embodiment, the number of coils of the coil array equals the number of magnetic poles of the magnet array.

With this arrangement, magnetic flux from the magnetic poles of the permanent magnets can be utilized effectively for generating a high level of driving force.

In another embodiment, in startup of the single-phase brushless motor in a reverse direction from a halt state, the drive control circuit initially executes forward movement and then changes to reverse movement after the forward movement by a prescribed amount.

It is possible for this single-phase brushless motor to operate in a reverse direction without the problem of a deadlock point occurring when the motor is operated in reverse.

In another embodiment, the magnetic member is configured such that the permanent magnets and the magnetic coils come to a halt at a position of peak back electromotive force by the magnetic coils, by attraction of the magnetic member to the magnet array when the single-phase brushless motor is at a halt.

It is possible for this single-phase brushless motor to be operated in reverse as-is, without the problem of a deadlock point occurring while the motor operates in reverse.

In another embodiment, the magnetic member is positioned on opposite side from the permanent magnets with the magnetic coils therebetween when the single-phase brushless motor is at a halt.

With this arrangement, since the magnetic members are positioned on the opposite side from the permanent magnets with the magnetic coils therebetween, it is possible attain the desired stop position with relatively few magnetic members.

It is possible for the present invention to be reduced to practice in various ways, for example, a single-phase brushless motor, a control method or drive method therefor, a control circuit or drive circuit, an actuator employing these, an electronic device or instrument, a household electrical appliance, or the like.

BRIEF DESCRIPTION OF THE DRAWINGS

FIGS. 1A and 1B are sectional views depicting the configuration of the motor unit of an electric motor in Embodiment 1;

FIGS. 2A to 2C illustrate the positional relationship of a magnet array and a coil array, and the relationship of magnetic sensor output to back electromotive force waveform;

FIGS. 7A to 7D illustrate several specific examples of structure of magnetic yokes;

FIGS. 12A to 12E illustrate internal configuration and operation of a drive signal generator;

FIGS. 13A to 13C illustrate correspondence relationships of sensor output waveform and drive signal waveform;

FIG. 14 is a block diagram depicting the internal configuration of a PWM unit;

FIG. 15 is a timing chart depicting operation of the PWM unit during forward rotation of the motor;

FIGS. 19A and 19B are illustrations comparing wire connections and operation of a conventional 2-phase motor and the single-phase motor of an embodiment of the invention;

FIG. 20 is a table showing characteristics of the conventional motor with those of the motor of an embodiment of the invention;

FIGS. 27A and 27B are sectional views depicting another configuration of a motor unit;

BEST MODE FOR CARRYING OUT THE INVENTION

Figure 3:
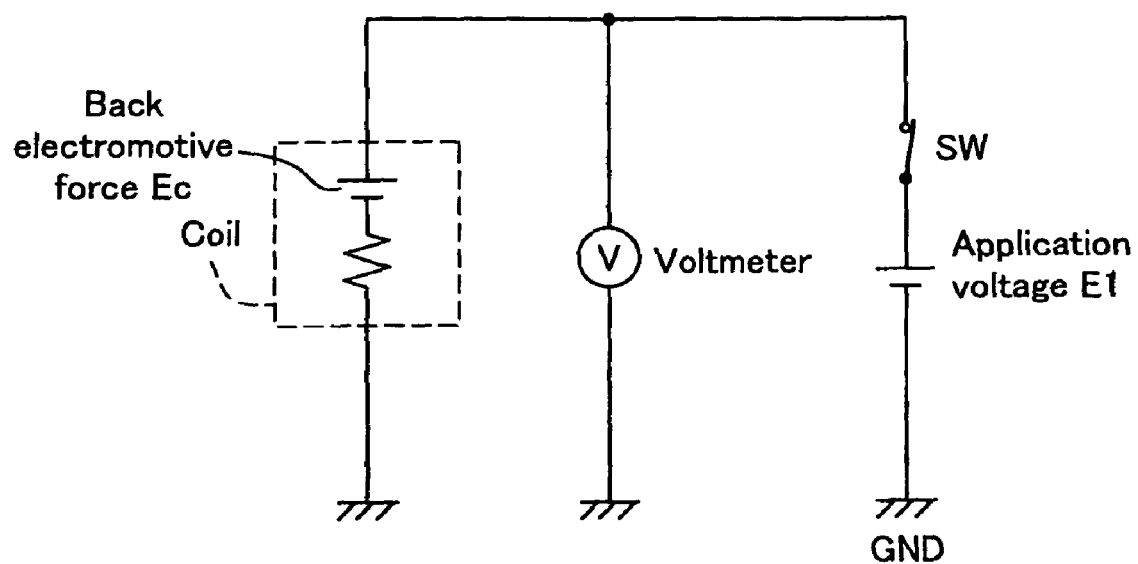
FIG. 3 is a model diagram illustrating the relationship of applied voltage to the coil and electromotive force.

The embodiments of the present invention will be discussed in the order indicated below.

A. Overview of Configuration and Operation of Motor of Embodiment 1
B. Configuration of Drive Control Circuit
C: Other Configuration Examples of Motor Unit
D. Embodiment 2
E. Modification Examples A. Overview of Configuration and Operation of Motor of Embodiment 1

FIGS. 1A and 1B are sectional views depicting the configuration of the motor unit of a single-phase brushless motor in Embodiment 1. This motor unit 100 has a stator portion 10 and a rotor portion 30, each of generally cylindrical tube shape. The stator portion 10 has four coils 11-14 arranged in a generally cross-shaped pattern, and a magnetic sensor 40 positioned at a center location between two of the coils 11, 12.

The magnetic sensor 40 is used to detect the position of the rotor portion 30 (i.e. the phase of the motor). Each coil 11-14 is provided with a magnetic yoke 20 formed of a magnetic material. The shape of the magnetic yoke 20 will be discussed in detail later. The coils 11-14 and the magnetic sensor 40 are affixed on a circuit board 120 (FIG. 1B). The circuit board 120 is affixed to a casing 102. The cover of the casing 102 is omitted in the drawing.

The rotor portion 30 has four permanent magnets 31-34; the center axis of the rotor portion 30 constitutes a rotating shaft 112. This rotating shaft 112 is supported by a shaft bearing portion 114 (FIG. 1B). The direction of magnetization of the magnets extends in a direction radially outward from the rotating shaft 112. A magnetic yoke 36 is disposed to the outside of the magnets 31-34. This magnetic yoke 36 may be omitted.

FIG. 2A illustrates the positional relationship of a magnet array and a coil array. FIGS. 2B and 2C show the relationship of magnetic sensor output to back electromotive force waveform. "Back electromotive force" is also called "induced voltage." As shown in FIG. 2A, the four magnets 31-34 are arranged at constant magnetic pole pitch Pm, with adjacent magnets being magnetized in opposite directions. The coils 11-14 are arranged at constant pitch Pc, with adjacent coils being excited in opposite directions. In this example, the magnetic pole pitch Pm is equal to the coil pitch Pc, and is equivalent to $\pi$ in terms of electrical angle. An electrical angle of $2\pi$ is associated with the mechanical angle or distance of displacement when the phase of the drive signal changes by $2\pi$. In the present embodiment, when the phase of the drive signal changes by $2\pi$, the rotor portion 30 undergoes displacement by the equivalent of twice the magnetic pole pitch Pm.

Of the four coils 11-14, the first and third coils 11, 13 are driven by drive signals of identical phase, while the second and fourth coils 12, 14 are driven by drive signals whose phase is shifted by 180 degrees ($=\pi$) from the drive signals of the first and third coils 11, 13. In ordinary two-phase driving, the phases of the drive signals of the two phases (Phase A and Phase B) would be shifted by 90 degrees ($=\pi/2$); in no instance would they be shifted by 180 degrees ($=\pi$). Also, in most motor drive methods, two drive signals phase-shifted by 180 degrees ($=\pi$) would be viewed as having identical phase. Consequently, the drive method of the motor in the present embodiment can be though of as single-phase driving.

FIG. 2A shows the positional relationship of the magnets 31-34 and the coils 11-14, with the motor at a stop. In the motor of this embodiment, the magnetic yoke 20 provided to each of the coils 11-14 is offset slightly towards the direction of normal rotation of the rotor portion 30, with respect to the center of the coil. Consequently, when the motor stops, the magnetic yoke 20 of each coil will be attracted by the magnets 31-34, bringing the rotor portion 30 to a halt at a position with the magnetic yokes 20 facing the centers of the magnets 31-34. As a result, the motor will come to a halt at a position with the centers of the coils 11-14 offsetted with respect to the centers of the magnets 31-34. The magnetic sensor 40 is also situated at a position offsetted slightly from the boundary between adjacent magnets. The phase at this stop location is denoted as $\alpha$. While the $\alpha$ phase is not zero, it may be a value close to zero (e.g. about 5 to 10 degrees).

FIG. 2B shows an example of waveform of back electromotive force generated by the coils; FIG. 2C shows an example of output waveform by the magnetic sensor 40. The magnetic sensor 40 is able to generate a sensor output SSA substantially similar in shape to the back electromotive force of the coils during motor operation. However, the output SSA of the magnetic sensor 40 has a non-zero value even when the motor is stopped (except in the case where the phase is an integral multiple of $\pi$). The back electromotive force of the coils tends to increase together with motor speed, but the shape of the waveform (sine wave) remains substantially similar. A Hall IC that utilizes the Hall effect may be employed as the magnetic sensor 40. In this example, the sensor output SSA and the back electromotive force Ec are both sine wave waveforms, or waveforms approximating a sine wave. As will be discussed later, the drive control circuitry of this motor utilizes the sensor output SSA to apply to the coils 11-14 voltage of waveform substantially similar in shape to the back electromotive force Ec.

In general, an electric motor functions as an energy conversion device that converts between mechanical energy and electrical energy. The back electromagnetic force of the coils represents mechanical energy of the motor that has been converted to electrical energy. Consequently, where electrical energy applied to the coils is converted to mechanical energy (that is, where the motor is driven), it is possible to drive the motor with maximum efficiency by applying voltage of similar waveform to the back electromagnetic force. As will be discussed below, "similar waveform to the back electromagnetic force" means voltage that generates current flowing in the opposite direction from the back electromagnetic force.

FIG. 3 is a model diagram illustrating the relationship of applied voltage to the coil and electromotive force. Here, the coil is simulated in terms of back electromotive force Ec and resistance. In this circuit, a voltmeter V is parallel-connected to the application voltage E1 and the coil. When voltage E1 is applied to the motor to drive the motor, back electromotive force Ec is generated with a direction of current flow in opposition to that of the application voltage E1. When a switch SW is opened while the motor is rotating, the back electromotive force Ec can be measured with the voltmeter V. The polarity of the back electromotive force Ec measured with the switch SW open will be the same as the polarity of the application voltage E1 measured with the switch SW closed. The phrase "application of voltage of substantially similar waveform to the back electromagnetic force" herein refers to application of voltage having the same polarity as, and having waveform of substantially similar shape to, the back electromotive force Ec measured by the voltmeter V.

As noted previously, when driving a motor, it is possible to drive the motor with maximum efficiency by applying voltage of waveform similar to that of the back electromagnetic force. It can be appreciated that, where the position at which polarity reverses in the sine wave-shaped back electromotive force waveform is denoted as the $\pi$ phase point, energy conversion efficiency will be relatively low in proximity to the $\pi$ phase point (in proximity to 0 voltage),; while conversely energy conversion efficiency will be relatively high in proximity to the peak of the back electromotive force waveform. Where a motor is driven by applying voltage of similar waveform to the back electromotive force, relatively high voltage can be applied during periods of high energy conversion efficiency, thereby improving efficiency of the motor. On the other hand, if the motor is driven with a simple rectangular waveform for example, considerable voltage will be applied in proximity to the position where back electromotive force is substantially 0 near the $\pi$ phase point (or middle point), so efficiency of the motor will be lower. Also, when voltage is applied during such periods of low energy conversion efficiency, vibrations are produced in directions other than the direction of rotation due to eddy current, thereby creating a noise problem.

As will be understood from the preceding discussion, the advantages of driving a motor by applying voltage of similar waveform to the back electromotive force are that motor efficiency will be improved, and vibration and noise will be reduced.

Figure 4A:
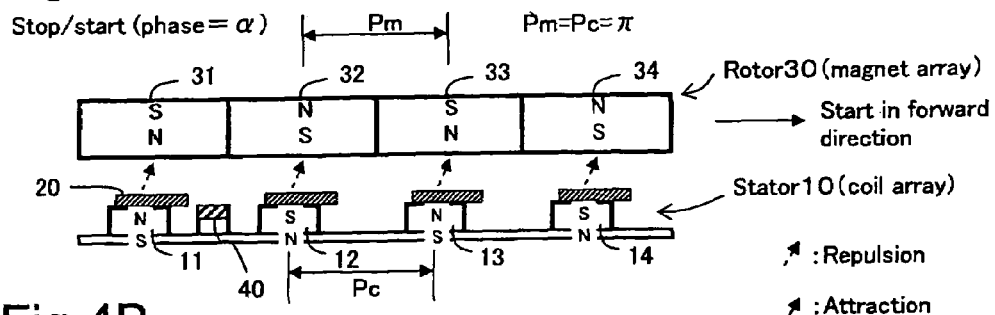
FIGS. 4A to 4E illustrate normal rotation of the motor.

FIGS. 4A to 4E illustrate normal rotation of the motor unit 100. FIG. 4A is the same as FIG. 2A, and depicts the positional relationships of the magnets 31-34 and the coils 11-14 at a stop. In the state depicted in FIG. 4A, excitation of the coils 11-14 produces forces of repulsion between the coils 11-14 and the magnets 31-34, in the direction indicated by the broken arrows. As a result, the rotor portion 30 begins to move in the direction of normal rotation (rightward in the drawing).

Figure 4B:
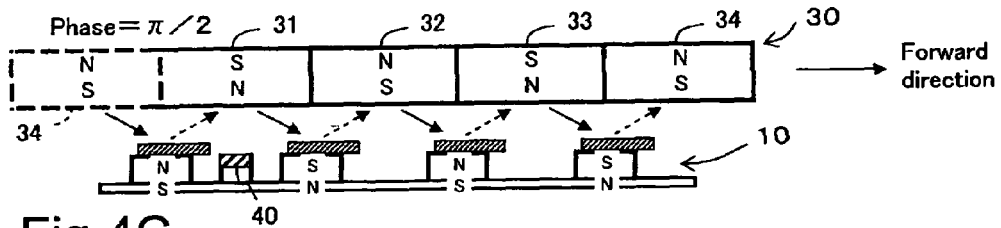
Figure 4C:
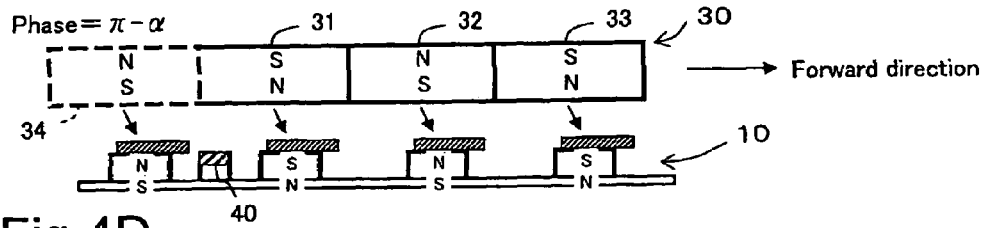
Figure 4D:
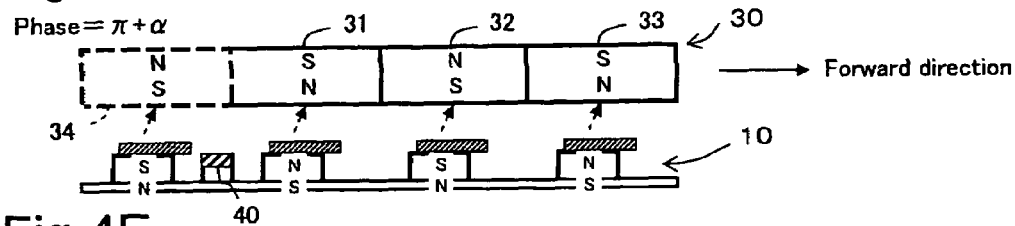
Figure 4E:
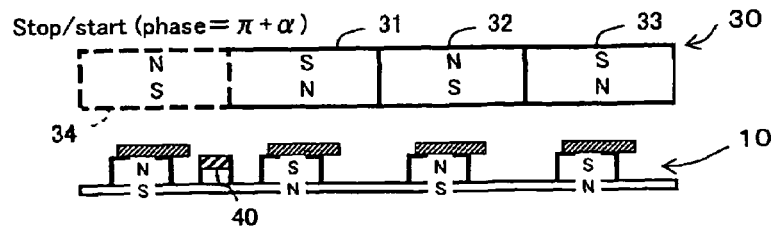

FIG. 4B depicts a state in which the phase has advanced to $\pi/2$. In this state, both forces of attraction (the solid arrows) and forces of repulsion (the broken arrows) are generated, causing strong driving force. FIG. 4C depicts a state in which the phase has advanced to $(\pi-\alpha)$. The coil excitation direction reverses coincident with the timing of the phase going to $\pi$, resulting in the state shown in FIG. 4D. If the motor stops in proximity to the state shown in FIG. 4D, the rotor portion 30 will come to stop at a position like that state shown in FIG. 4E, with the magnetic yokes 20 attracted towards the magnets 31-34. This position is the $(\pi+\alpha)$ phase position. Thus, it will be understood that the motor of the present embodiment will come to a stop at a phase position of $\alpha \pm n\pi$ where n is an integer.

Figure 5A:
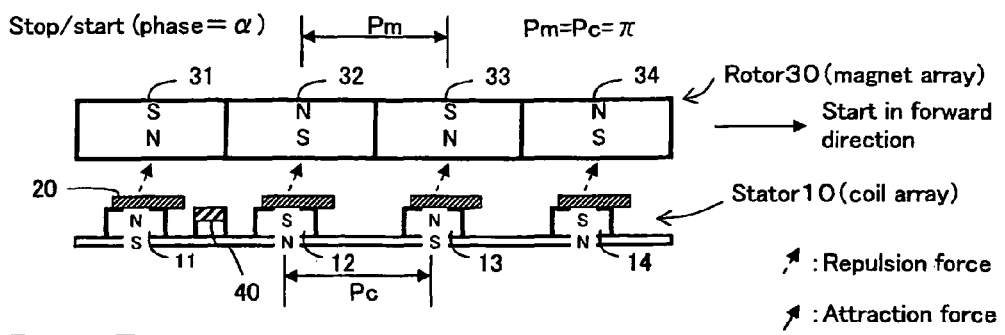
FIGS. 5A to 5E illustrate reverse rotation of the motor.

FIGS. 5A to 5E illustrate reverse rotation of the motor unit 100. FIG. 5A is the same as FIG. 4A, and depicts the motor at a stop. When the coils 11-14 are excited in the opposite direction from FIG. 4A for the purpose of reverse rotation from a stop, forces of attraction (not shown) act between the magnets 31-34 and the coils 11-14. These forces of attraction urge the rotor portion 30 to move in the direction of reverse rotation. However, since the forces of attraction are fairly weak, in some instances they will be overcome by the forces of attraction between the magnets 31-34 and the magnetic yokes 20, and reverse rotation of the rotor portion 30 will not be possible.

Figure 5B:
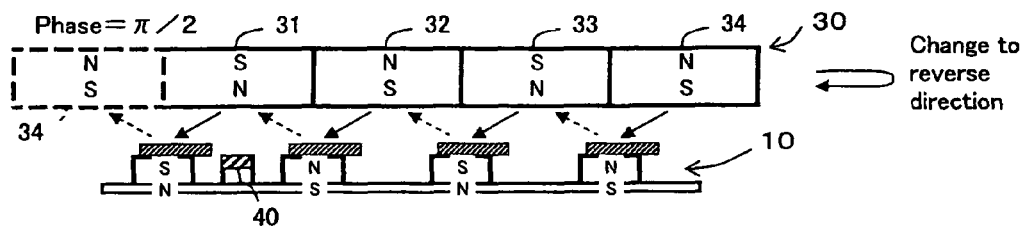
Figure 5C:
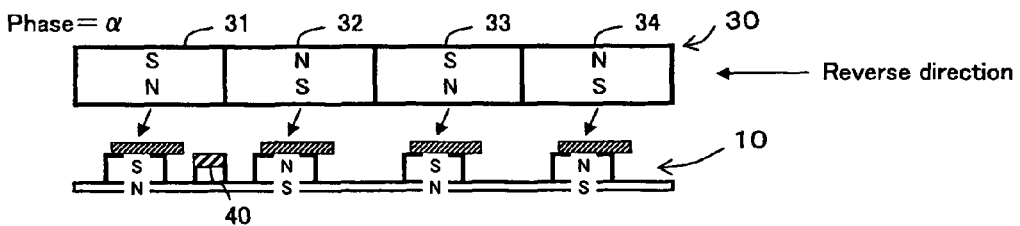
Figure 5D:
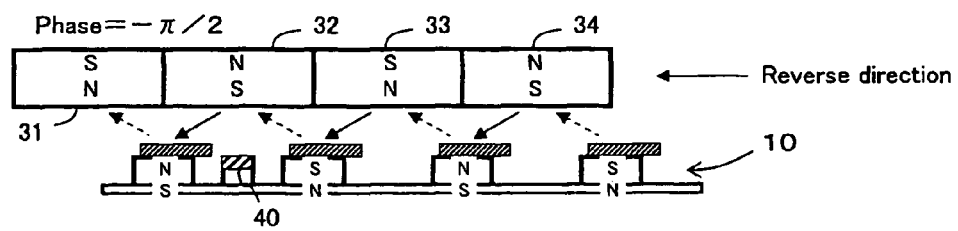
Figure 5E:
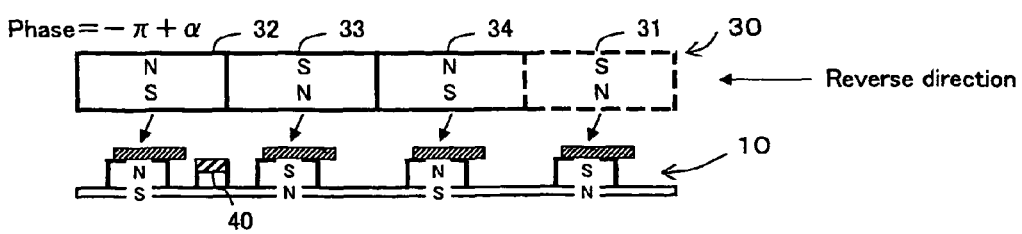

Accordingly, in the present embodiment, even where the motor is to be operated in reverse, at startup the rotor portion 30 will be initially operated in the normal rotation direction as shown in FIG. 5A. Then, once the rotor portion 30 has rotated by a prescribed amount (e.g. when the phase has advanced by about $\pi/2$), the drive signal will reversed and reverse operation initiated as shown in FIG. 5B. Once the rotor portion 30 begins to rotate in reverse in this way, the rotor portion 30 will be able to pass the initial stop position (phase=$\alpha$) due to inertia (FIG. 5C). Subsequently, the coil excitation direction reverses coincident with the timing of the phase going to 0. FIG. 5D depicts the $-\pi/2$ phase state, and FIG. 5E depicts the $-\pi+\alpha$ phase state. If the motor is stopped in proximity to the state of FIG. 5E, the rotor portion 30 will come to a stop at a position of phase $=-\pi+\alpha$ with the magnetic yokes 20 attracted by the magnets 31-34.

Figure 6:
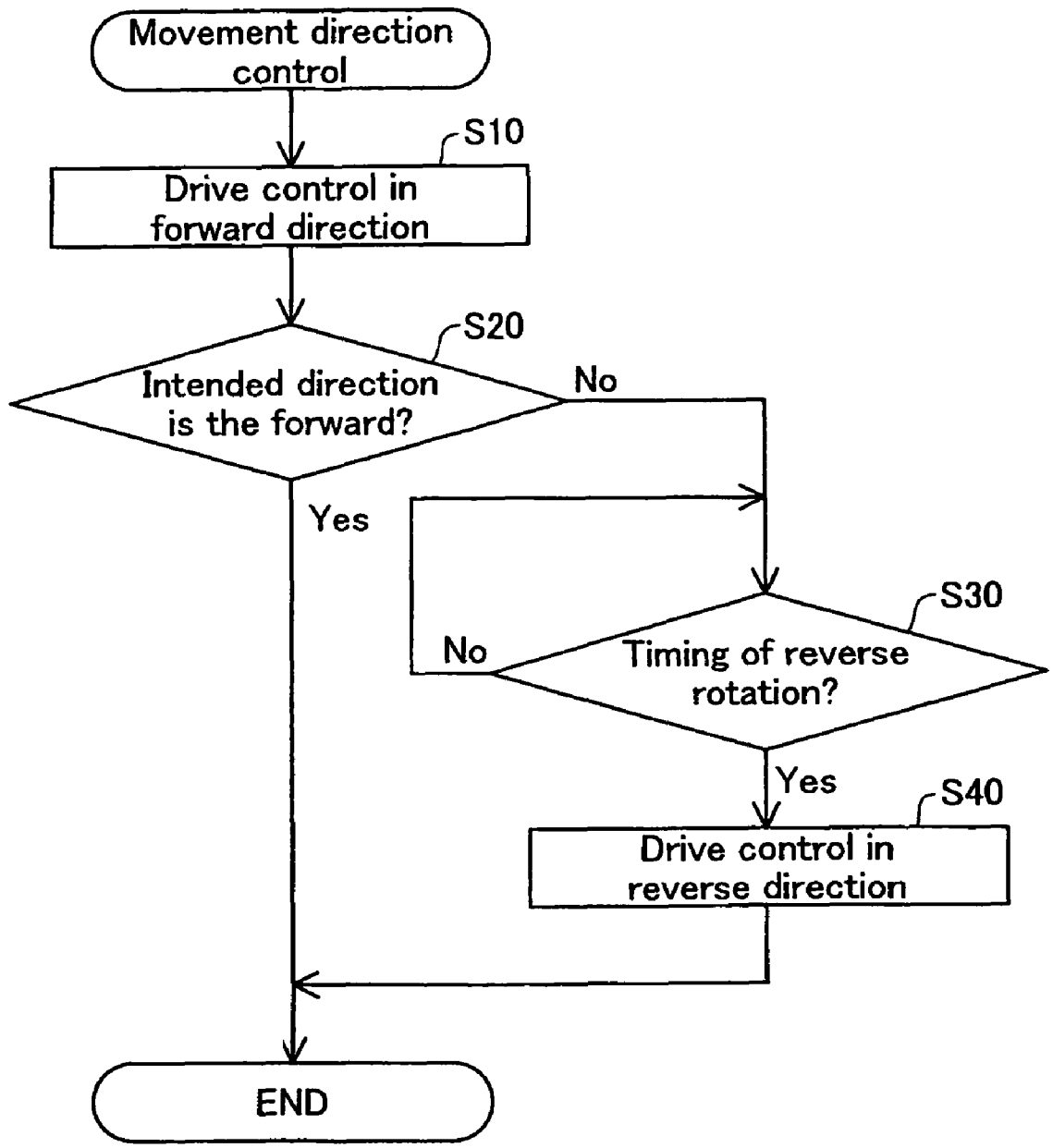
FIG. 6 is a flowchart showing the control process of the direction of movement of the motor.

FIG. 6 is a flowchart illustrating the control process of the direction of movement of the motor. This process is executed by a drive control circuit, to be discussed later. First, in Step S10, drive control in the forward direction is initiated. In Step S20, it is determined whether the intended direction of movement is the forward direction. The direction of movement will have been input to the drive control circuit by a human operator prior to Step S10. In the event that the intended direction of movement is the forward direction, drive control in the forward direction will continue on as-is. If on the other hand the intended direction of movement is the reverse direction, in Step S30, the circuit will wait for the prescribed timing of reverse rotation. Once the prescribed timing of reverse rotation is reached, in Step S40, drive control in the reverse direction is initiated.

In this way, with the motor of the present embodiment, the motor will come to a stop at a phase position of $\alpha \pm n\pi$ where $\alpha$ is a prescribed value other than zero or $n\pi$, and n is an integer, and thus deadlock points will be avoided. Accordingly, startup will always be possible without the need for a startup coil. Moreover, with the motor of the embodiment, it is possible to accomplish reverse operation by initiating the motor movement with normal rotation for a prescribed small duration from a stop and subsequently changing to reverse rotation.

FIGS. 7A to 7D illustrate several specific examples of structure of the magnetic yokes 20. In these drawings, the shaded portions represent magnetic members making up the magnetic yokes. In preferred practice the magnetic yokes 20 will be formed from a ferromagnetic body. The first magnetic yoke 20a shown in FIG. 7A has a tabular portion 21 positioned between the coils 11-14 and the magnets 31-34, and a core portion 22 that functions as the core of the coil. The tabular portion 21 has nonuniform shape in the left-right direction. As a result, when the magnetic yoke 20a is attracted by a magnet, it will come to a stop at a position with the center of coil offsetted from the center of the magnet. The second magnetic yoke 20b shown in FIG. 7B has tabular portions 21b, 23b provided at either side of a core portion 22. While the first tabular portion 21b facing the magnets has uniform shape in the left-right direction, the second tabular portion 23b on the opposite side has a recess at a location offset slightly to the left of center, giving it nonuniform shape in the left-right direction. The third magnetic yoke 20c shown in FIG. 7C also has tabular portions 21c, 23c provided at opposite sides of a core portion 22. In this example, the first tabular portion 21c facing the magnets has convex shape that is nonuniform in the left-right direction, while the second tabular portion 23c on the opposite side has uniform shape in the left-right direction. The fourth magnetic yoke 20d shown in FIG. 7D is a modified version of the magnetic yoke shown in FIG. 7C, in which the core portion 22d is of nonuniform structure in the left-right direction.

In the magnetic yokes 20b, 20d depicted in FIGS. 7B and 7D, portions except for the tabular portions 21b, 21c (i.e. the portions situated between the coils and the magnets) have nonuniform shape in relation to the direction of motor operation (the left-right direction), and therefore it would be acceptable to omit the tabular portions 21b, 21c in these magnetic yokes 20b, 20d. However, by providing the portions 21b, 21c situated between the coils and the magnets, it is possible to attain the desired stop position using relatively few magnetic members. Moreover, while in the examples of FIGS. 7A to 7D the magnetic yokes are always provided with a core portion, the core portion may be dispensed with. However, where the magnetic yokes have a core portion, through engineering the shape of the core portions, it will be easier to design the motor so as to come to a stop with the centers of the permanent magnets offsetted from the centers of the magnetic coils.

By employing as the magnetic yokes provided to the coils magnetic yokes that are attracted to the magnet array when the motor is at a stop, it will be possible to construct various shapes adapted to bring the motor to a stop at a position with the centers of the permanent magnets offsetted from the centers of the magnetic coils.

B. Configuration of Drive Control Circuit

Figure 8A:
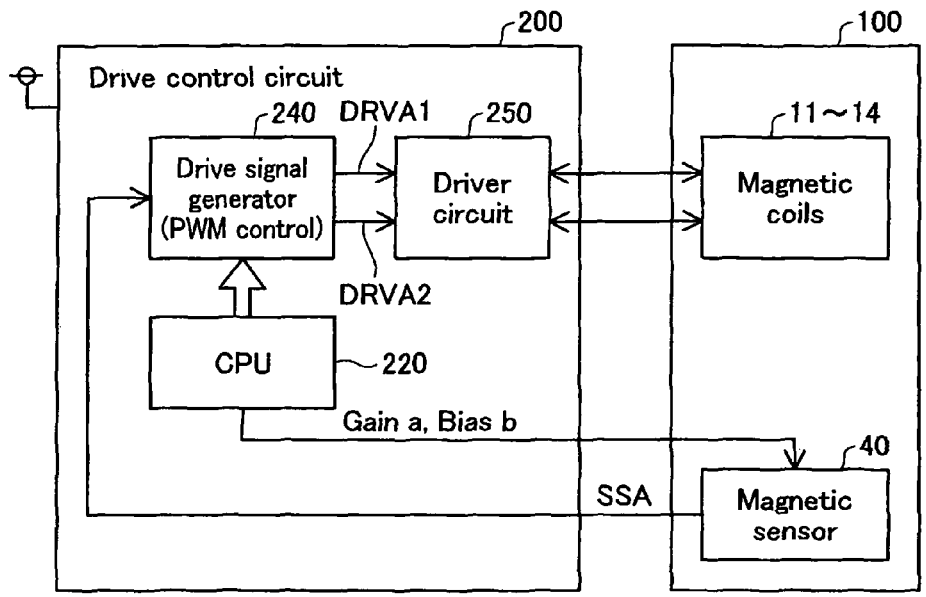
FIGS. 8A and 8B are block diagrams depicting configurations of a drive control circuit of the motor of Embodiment 1.

FIG. 8A is a block diagram depicting a configuration of a drive control circuit of the brushless motor of the present embodiment. The drive control circuit 200 has a CPU 220, a drive signal generator 240, and a driver circuit 250. The drive signal generator 240 generates a single-phase drive signal DRVA1, DRVA2 on the basis of the output signal SSA of the magnetic sensor 40 in the motor unit 100. The driver circuit 250 drives the magnetic coils 11-14 in the motor unit 100, in accordance with the single-phase drive signal DRVA1, DRVA2. The CPU 220 may be omitted. Where the CPU 220 is omitted, the functions performed by the CPU 220 described in this embodiment will be accomplished by another circuit (e.g. a logic circuit or nonvolatile memory). Alternatively, the CPU 220 may be substituted by a communications circuit or interface circuit, which will receive various operating instructions from an external device, and transfer the instructions to circuit elements within the drive control circuit 200.

Figure 8B:
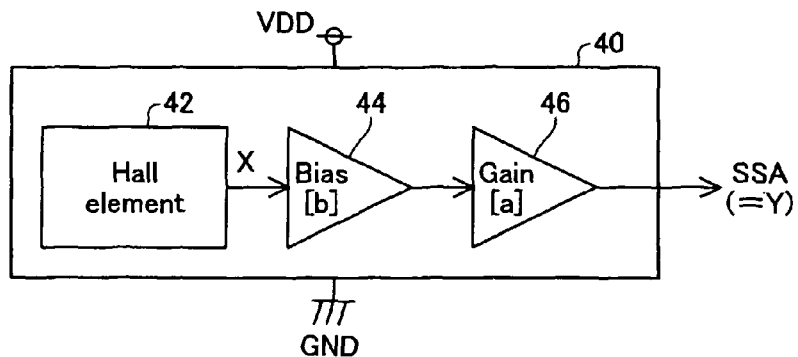

FIG. 8B shows an exemplary internal configuration of the magnetic sensor 40. The magnetic sensor 40 has a Hall element 42, a bias adjuster 44, and a gain adjuster 46. The Hall element 42 measures magnetic flux density X. The bias adjuster 44 adds a bias value b to the output X of the Hall element 42; the gain adjuster 46 performs multiplication by a gain value a. The output SSA (=Y) of the magnetic sensor 40 is given by Expression (1) or Expression (2) below.

$$Y = a \cdot X + b \quad (1)$$

$$Y = a(X + b) \quad (2)$$

The gain value a and the bias value b of the magnetic sensor 40 are set internally in the magnetic sensor 40 by the CPU 220. By setting the gain value a and the bias value b to appropriate values, it is possible to correct the sensor output SSA to a desirable waveform shape.

Figure 9:
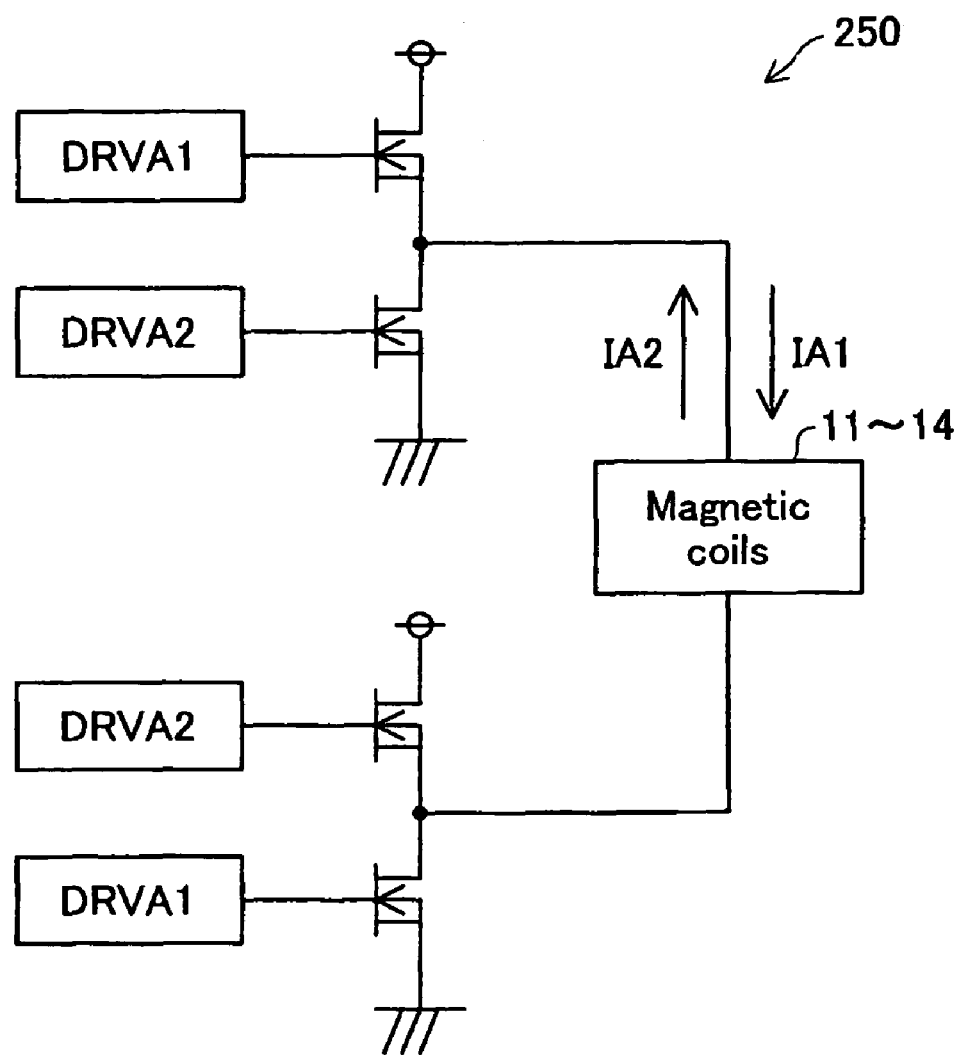
FIG. 9 is a diagram depicting the internal configuration of a driver circuit.

FIG. 9 is a diagram depicting the internal configuration of the driver circuit 250. This driver circuit 250 is an H bridge circuit which drives the coils 11-14 according to the AC single-phase drive signals DRVA1, DRVA2. The arrows labeled IA1, IA2 respectively indicate the direction of current flow by the single-phase drive signals DRVA1, DRVA2.

Figure 10A:
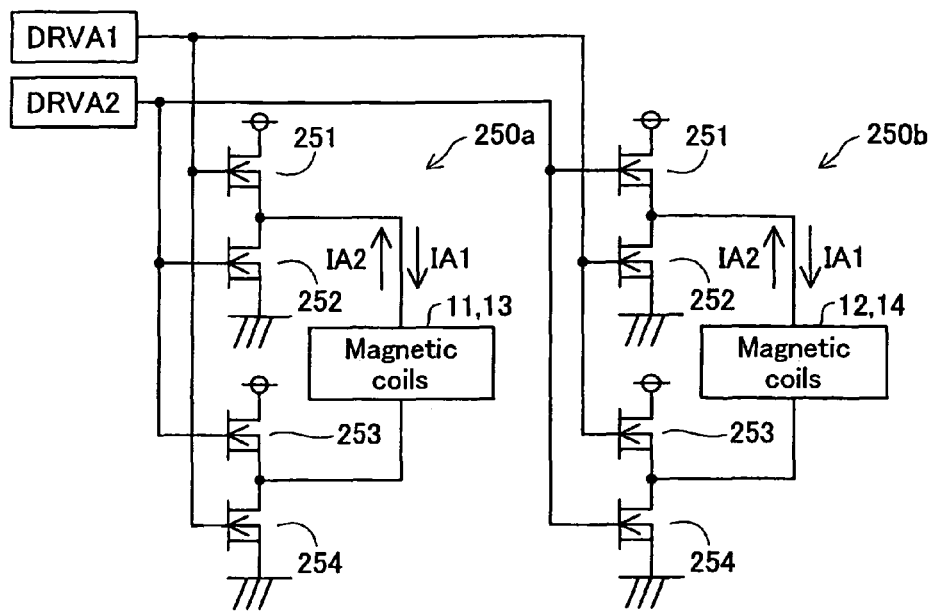
FIGS. 10A to 10C are illustrations of another configuration and operation of a driver circuit.
Figure 10B:
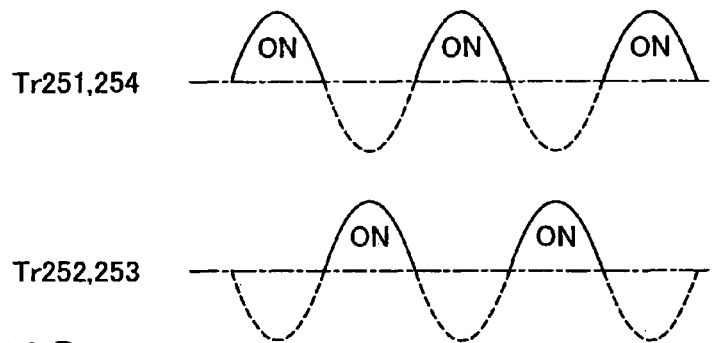
Figure 10C:
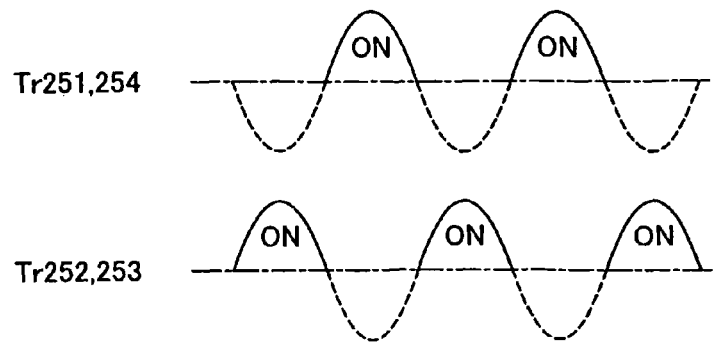
Figure 11A:
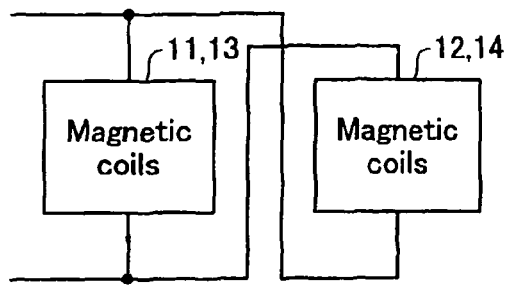
FIGS. 11A to 11D are illustrations of various coil winding configurations.
Figure 11B:
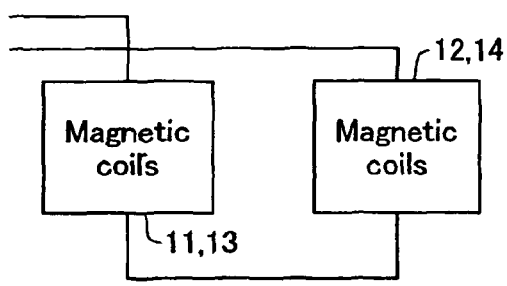
Figure 11C:
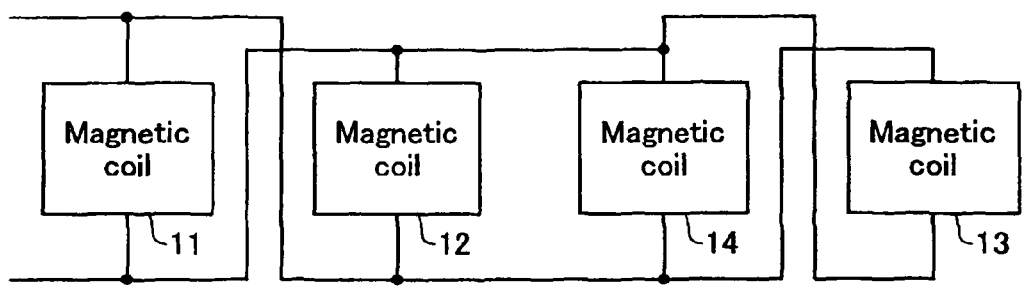
Figure 11D:
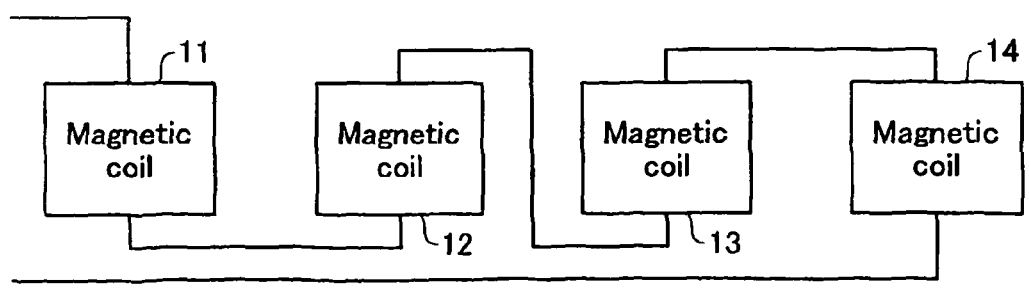

FIGS. 10A to 10C are illustrations of another configuration and operation of a driver circuit. This driver circuit is composed of a first bridge circuit 250a for use with a first set of magnetic coils 11, 13, and a second bridge circuit 250b for use with a second set of magnetic coils 12, 14. Each of the bridge circuits 250a, 250b includes four transistors 251-254; this configuration is identical to that shown in FIG. 9. In the first bridge circuit 250a, the first drive signal DRVA1 is supplied to the transistors 251, 254, while the second drive signal DRVA2 is supplied to the other transistors 252, 253. In the second bridge circuit 250b on the other hand, the first drive signal DRVA1 is supplied to the transistors 252, 253, while the second drive signal DRVA2 is supplied to the other transistors 251, 254. As a result, operations with the first bridge circuit 250a and the second bridge circuit 250b are the reverse of one another. Consequently, the first set of magnetic coils 11, 13 driven by the first bridge circuit 250a and the second set of magnetic coils 12, 14 driven by the second bridge circuit 250b are phase-shifted by π with respect to each other. In the circuit shown in FIG. 9 on the other hand, the coil winding configuration of the first set of coils 11, 13 is the reverse of the coil winding configuration of the second set of coils 12, 14, with the phases of the two sets shifted by π through the different winding configurations. Thus, the driver circuit of FIG. 9 and the driver circuit of FIG. 10A share the feature of shifting the phases of the two sets of coils by π with respect to each other, and both will realize driving of a 1-phase motor.

FIGS. 11A to 11D are illustrations of various winding configurations for the magnetic coils 11-14. By engineering the winding configuration as in these examples, it is possible for adjacent coils to always be excited in opposite directions.

FIGS. 12A to 12E illustrate internal configuration and operation of the drive signal generator 240 (FIG. 8A). The drive signal generator 240 has a basic clock generating circuit 510, a 1/N frequency divider, a PWM unit 530, a moving direction register 540, a multiplier 550, an encoder unit 560, an AD converter 570, a voltage control value register 580, and an excitation interval setting unit 590.

The basic clock generating circuit 510 generates a clock signal PCL of prescribed frequency, and includes a PLL circuit for, example. The frequency divider 520 generates a clock signal SDC having a frequency equal to 1/N the frequency of the clock signal PCL. The value of N is set to a prescribed constant. This value of N has been previously established in the frequency divider 520 by the CPU 220. The PWM unit 530 generates the AC single-phase drive signals DRVA1, DRVA2 (FIG. 8A) based on the clock signals PCL, SDC, a multiplication value Ma supplied by the multiplier 550, a forward/reverse direction value RI supplied by the moving direction register 540, a positive/negative sign signal Pa supplied by the encoder unit 560, and an excitation interval signal Ea supplied by the excitation interval setting unit 590. This operation will be discussed later.

A value RI indicating the direction for motor rotation is established in the moving direction register 540, by the CPU 220. In the present embodiment, the motor will rotate forward when the forward/reverse direction value RI is L level, and rotate in reverse rotation when H level. The other signals Ma, Pa, Ea supplied to the PWM unit 530 are determined as follows.

The output SSA of the magnetic sensor 40 is supplied to the AD converter 570. This sensor output SSA has a range, for example, of from GND (ground potential) to VDD (power supply voltage), with the middle point thereof (=VDD/2) being the π phase point of the output waveform, or the point at which the sine wave passes through the origin. The AD converter 570 performs AD conversion of this sensor output SSA to generate a digital value of sensor output. The output of the AD converter 570 has a range, for example, of FFh to 0 h (the "h" suffix denotes hexadecimal), with the median value of 80 h corresponding to the π phase point of the sensor waveform.

The encoder unit 560 converts the range of the sensor output value subsequent to AD conversion, and sets the value of the π phase point of the sensor output value to 0. As a result, the sensor output value Xa generated by the encoder unit 560 assumes a prescribed range on the positive side (e.g. between +127 and 0) and a prescribed range on the negative side (e.g. between 0 and −127). However, the value supplied to the multiplier 560 by the encoder unit 560 is the absolute value of the sensor output value Xa; the positive/negative sign thereof is supplied to the PWM unit 530 as the positive/negative sign signal Pa.

The voltage control value register 580 stores a voltage control value Ya established by the CPU 220. This voltage control value Ya, together with the excitation interval signal Ea discussed later, functions as a value for setting the application voltage to the motor. The value Ya can assume a value between 0 and 1.0, for example. Assuming an instance where the excitation interval signal Ea has been set with no non-excitation intervals provided so that all of the intervals are excitation intervals, Ya=0 will mean that the application voltage is zero, and Ya=1.0 will mean that the application voltage is at maximum value. The multiplier 550 performs multiplication of the voltage control value Ya and the sensor output value Xa output from the encoder unit 560 and conversion to an integer; the multiplication value Ma thereof is supplied to the PWM unit 530.

FIGS. 12B to 12E depict operation of the PWM unit 530 in instances where the multiplication value Ma takes various different values. Here, it is assumed that there are no non-excitation intervals, so that all intervals are excitation intervals. The PWM unit 530 is a circuit that, during one period of the clock signal SDC, generates one pulse with a duty factor of Ma/N. Specifically, as shown in FIGS. 12B to 12E, the pulse duty factor of the single-phase drive signals DRVA1, DRVA2 increases in association with increase of the multiplication value Ma. The first drive signal DRVA1 is a signal that generates a pulse only when the sensor output SSA is positive and the second drive signal DRVA2 is a signal that generates a pulse only when the sensor output SSA is positive; in FIGS. 12B to 12E, both are shown together. For convenience, the second drive signal DRVA2 is shown in the form of pulses on the negative side.

FIGS. 13A to 13C depict correspondence between sensor output waveform and waveform of the drive signals generated by the PWM unit 530. In the drawing, "Hiz" denotes a state of high impedance where the magnetic coils are not excited. As described in FIGS. 12B to 12E, the single-phase drive signals DRVA1, DRVA2 are generated by PWM control using the analog waveform of the sensor output SSA. Consequently, using these single-phase drive signals DRVA1, DRVA2 it is possible to supply to the coils effective voltage that exhibits changes in level corresponding to change in the sensor outputs SSA, SSB.

The PWM unit 530 is constructed such that drive signals are output only during the excitation intervals indicated by the excitation interval signal Ea supplied by the excitation interval setting unit 590, with no drive signals being output at intervals except for the excitation intervals (non-excitation intervals). FIG. 13C depicts drive signal waveforms produced in the case where excitation intervals EP and non-excitation intervals NEP have been established by the excitation interval signal Ea. During the excitation intervals EP, the drive signal pulses of FIG. 13B are generated as is; during the non-excitation intervals NEP, no pulses are generated. By establishing excitation intervals EP and non-excitation intervals NEP in this way, voltage will not be applied to the coils in proximity to the middle point of the back electromotive force waveform (i.e. in proximity to the middle point of the sensor output), thus making possible further improvement of motor efficiency. Preferably the excitation intervals EP will be established at intervals symmetric about the π/2 phase point, where the position in the back electromotive force waveform (induced voltage waveform) at which polarity reverses is denoted as the π phase point; and preferably the non-excitation intervals NEP will be established in intervals symmetric about the π phase point of the back electromotive force waveform.

As discussed previously, if the voltage control value Ya is set to a value less than 1, the multiplication value Ma will be decreased in proportion to the voltage control value Ya. Consequently, effective adjustment of application voltage is possible by the voltage control value Ya as well.

As will be understood from the preceding description, with the motor of the present embodiment, it is possible to adjust the application voltage using both the voltage control value Ya and the excitation interval signal Ea. In preferred practice, relationships between desired application voltage on the one hand, and the voltage control value Ya and excitation interval signal Ea on the other, will be stored in advance in table format in memory in the drive control circuit 200 (FIG. 8A).

By so doing, when the drive control circuit 200 has received a target value for the desired application voltage from the outside, it will be possible for the CPU 220, in response to the target value, to set the voltage control value Ya and the excitation interval signal Ea in the drive signal generator 240. Adjustment of application voltage does not require the use of both the voltage control value Ya and the excitation interval signal Ea, and it would be acceptable to use either one of them instead.

FIG. 14 is a block diagram depicting the internal configuration of the PWM unit 530 (FIG. 12A). The PWM unit 530 has a counter 531, an EXOR circuit 533, and a drive waveform shaping circuit 535. Their operation will be described below.

FIG. 15 is a timing chart depicting operation of the PWM unit 530 during forward rotation of the motor. The drawing show the two clock signals PCL and SDC, the forward/reverse direction value RI, the excitation interval signal Ea, the multiplication value Ma, the positive/negative sign signal Pa, the counter value CM1 in the counter 531, the output SI of the counter 531, the output S2 of the EXOR circuit 533, and the output signals DRVA1, DRVA2 of the drive waveform shaping circuit 535. For each one cycle of the clock signal SDC, the counter 531 repeats an operation of decrementing the count value CM1 to 0, in sync with the clock signal PCL. The initial value of the count value CM1 is set to the multiplication value Ma. In FIG. 15, for convenience in illustration, negative multiplication values Ma are shown as well; however, the counter 531 uses the absolute values |Ma| thereof. The output S1 of the counter 531 is set to H level when the count value CM1 is not 0, and drops to L level when the count value CM1 is 0.

The EXOR circuit 533 outputs a signal S2 that represents the exclusive OR of the positive/negative sign signal Pa and the forward/reverse direction value RI. Where the motor is rotating forward, the forward/reverse direction value RI will be at L level. Consequently, the output S2 of the EXOR circuit 533 will be a signal identical to the positive/negative sign signal Pa. The drive waveform shaping circuit 535 generates the drive signals DRVA1, DRVA2 from the output S1 of the counter 531 and the output S2 of the EXOR circuit 533. Specifically, in the output S1 of the counter 531, the signal during intervals in which the output S2 of the EXOR circuit 533 is at L level will be output as the drive signal DRVA1, and the signal during intervals in which the output S2 of the EXOR circuit 533 is at H level will be output as the drive signal DRVA2. In proximity to the right edge in FIG. 15, the excitation interval signal Ea falls to L level thereby establishing a non-excitation interval NEP. Consequently, neither of the drive signals DRVA1, DRVA2 will be output during this non-excitation interval NEP, and a state of high impedance will be maintained.

Figure 16:
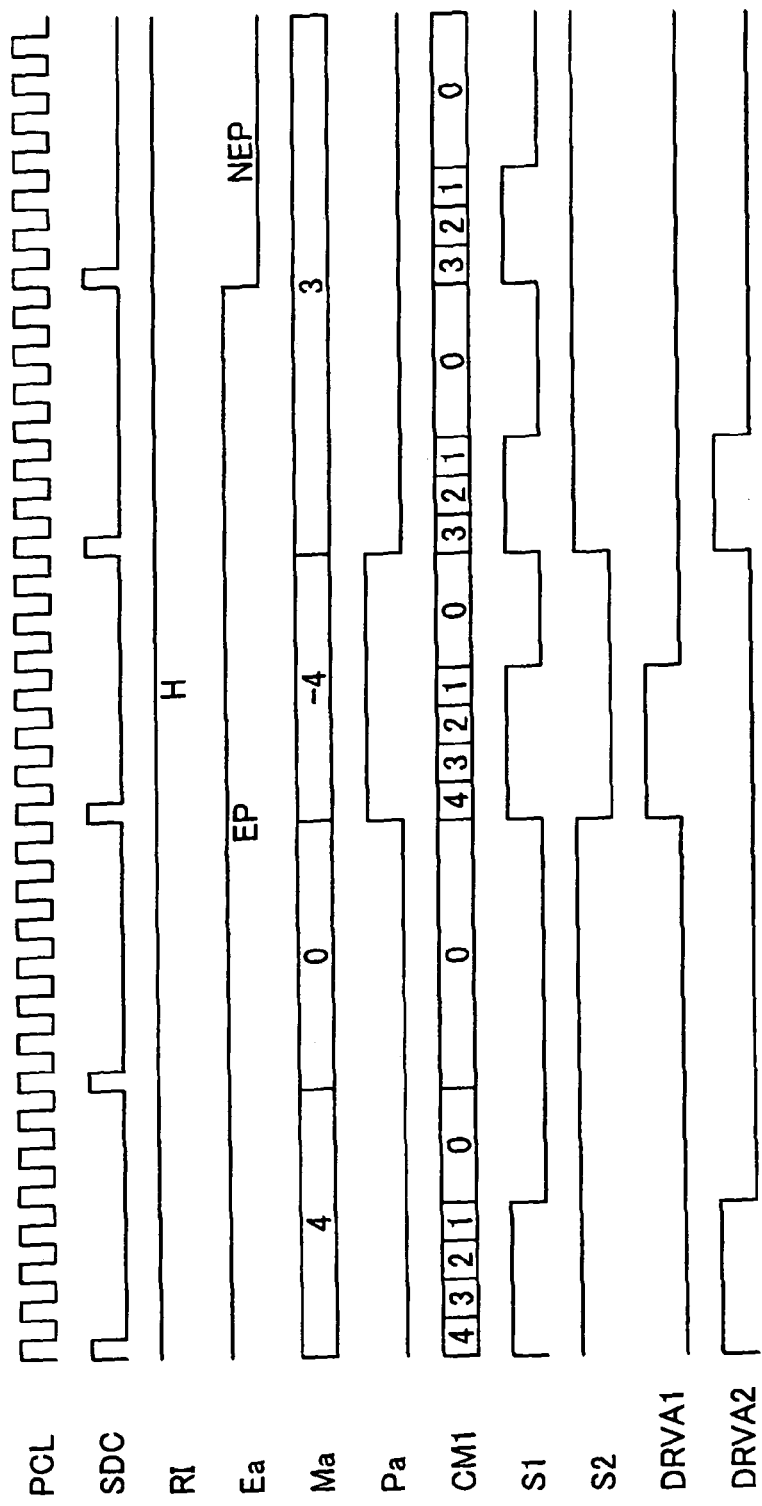
FIG. 16 is a timing chart depicting operation of the PWM unit during reverse rotation of the motor.

FIG. 16 is a timing chart depicting operation of the PWM unit 530 during reverse rotation of the motor. Where the motor is rotating in reverse, the forward/reverse direction value RI will be at H level. As a result, the two drive signals DRVA1, DRVA2 switch relative to FIG. 15, and it will be appreciated that the motor runs in reverse as a result.

Figure 17A:
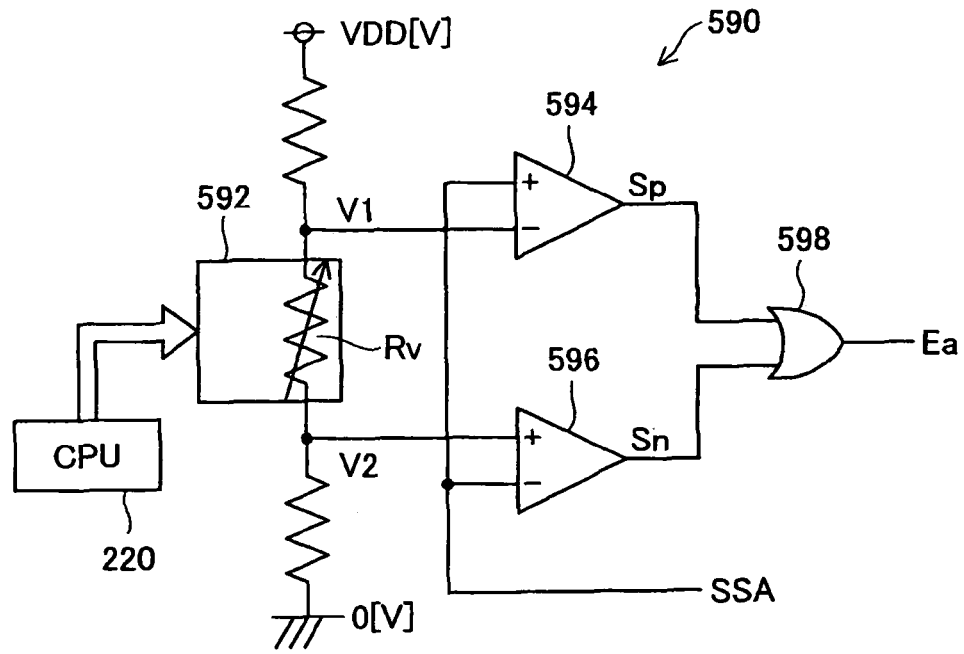
FIGS. 17A and 17B illustrate the internal configuration and operation of an excitation interval setting unit.
Figure 17B:
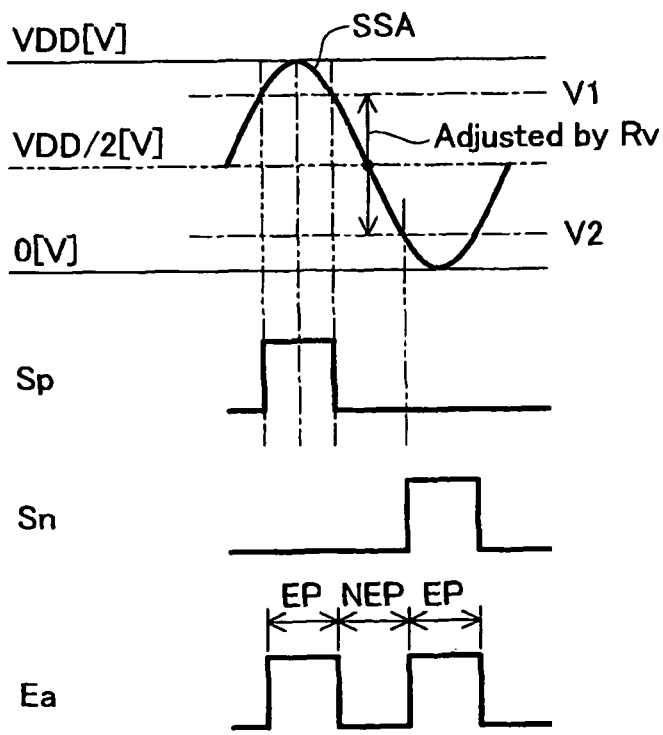

FIGS. 17A and 17B illustrate the internal configuration and operation of an excitation interval setting unit 590. The excitation interval setting unit 590 has an electronic variable resistor 592, a voltage comparators 594, 596, and an OR circuit 598. The resistance Rv of the electronic variable resistor 592 is set by the CPU 220. The voltages V1, V2 at either terminal of the electronic variable resistor 592 are supplied to one of the input terminals of the voltage comparators 594, 596. The sensor output SSA is supplied to the other input terminal of the voltage comparators 594, 596. The output signals Sp, Sn of the voltage comparators 594, 596 are input to the OR circuit 598. The output of the OR circuit 598 is the excitation interval signal Ea, which is used to differentiate excitation intervals and non-excitation intervals.

FIG. 17B depicts operation of the excitation interval setting unit 590. The voltages V1, V2 at the terminals of the electronic variable resistor 592 are modified by adjusting the resistance Rv. Specifically, the terminal voltages V1, V2 are set to values of equal difference from the median value of the voltage range (=VDD/2). In the event that the sensor output SSA is higher than the first voltage V1, the output Sp of the first voltage comparator 594 goes to H level, whereas in the event that the sensor output SSA is lower than the second voltage V2, the output Sn of the second voltage comparator 596 goes to H level. The excitation interval signal Ea is a signal derived by taking the logical sum of the these output signals Sp, Sn. Consequently, as shown at bottom in FIG. 17B, the excitation interval signal Ea can be used as a signal indicating excitation intervals EP and non-excitation intervals NEP. The excitation intervals EP and non-excitation intervals NEP are established by the CPU 220, by adjusting the variable resistance Rv.

Figure 18A:
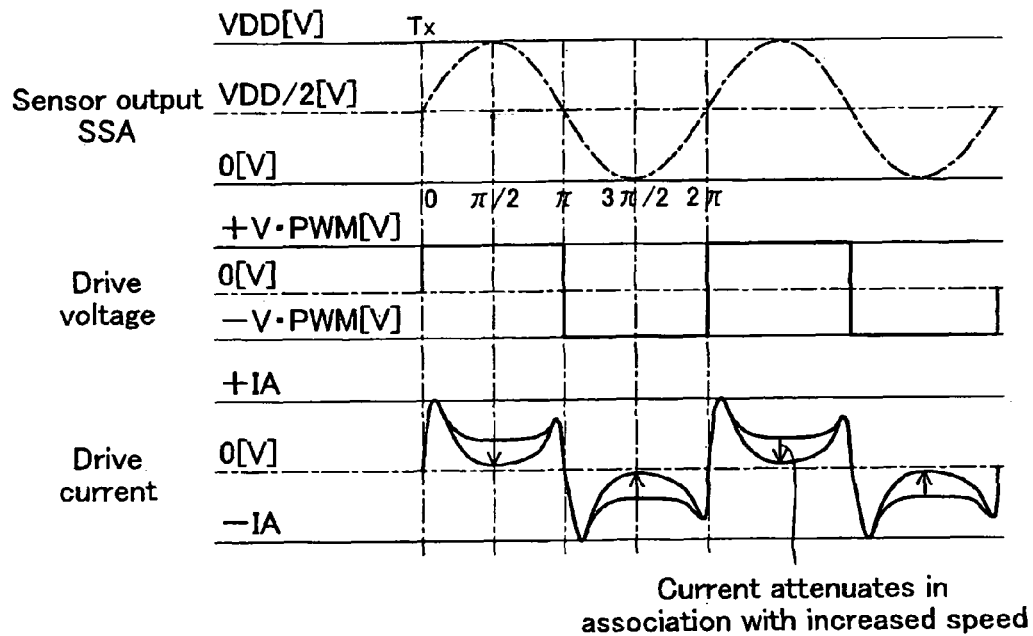
FIGS. 18A and 18B are illustrations comparing various signal waveforms in the case where the motor of Embodiment 1 is driven by a rectangular wave, and where driven by a sine wave.
Figure 18B:
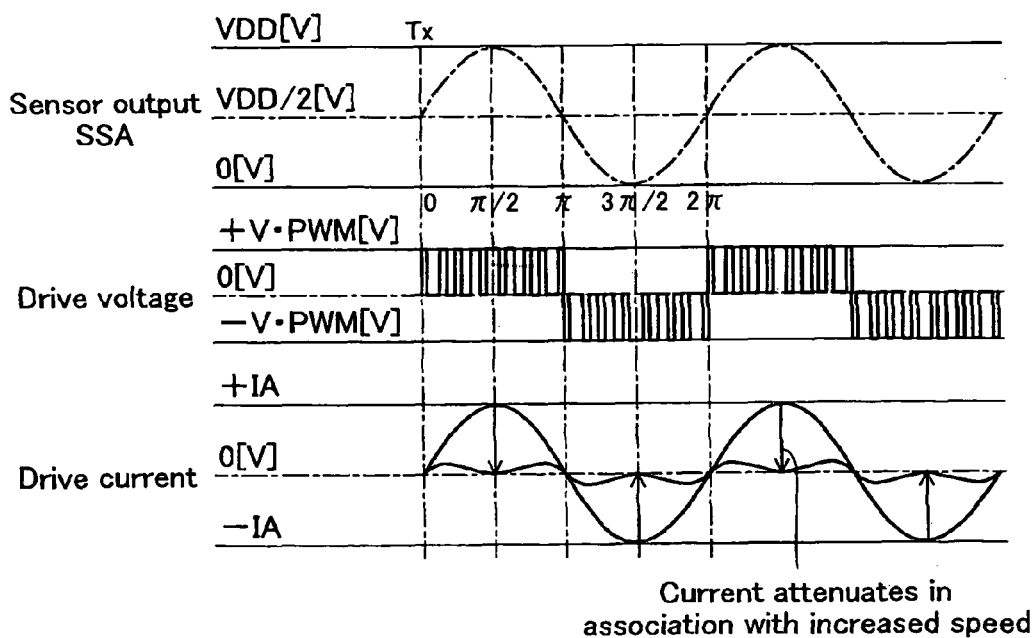

FIGS. 18A and 18B are illustrations comparing various signal waveforms in the case where the motor of the embodiment discussed above is driven by a rectangular wave, and where driven by a sine wave. Where a rectangular wave is employed for driving, a drive voltage of rectangular wave shape is applied to the coils. While the drive current is close to a rectangular wave at startup, it decreases as rotation speed increases. This is because the back electromotive force increases in response to the increased rotation speed (FIG. 2B). With a rectangular wave, however, despite increased rotation speed the current value will not decline appreciably in proximity to the timing of switching of the drive voltage at phase=nπ, so a fairly large current will tend to flow.

On the other hand, where a sine wave is employed for driving, PWM control is employed for the drive voltage so that the effective values of the drive voltage have sine wave shape. While the drive current is close to a sine wave at startup, as rotation speed increases the drive current will decrease due to the effects of back electromotive force. With sine wave driving, the current value declines appreciably in proximity to the timing of switching of the drive voltage polarity at phase=nπ. As discussed in the context of FIGS. 2A to 2C, generally speaking the energy conversion efficiency of a motor is low in proximity to the timing of switching of the drive voltage polarity. With sine wave driving, the current value during intervals of low efficiency is lower than with rectangular wave, making it possible to drive the motor more efficiently.

FIGS. 19A and 19B are illustrations comparing wire connections and operation of a conventional 2-phase motor and the single-phase motor of an embodiment of the invention. As shown in FIG. 19A, with a conventional 2-phase motor, either the Phase A coil CLa or the Phase B coil CLb, but not both, are driven at any one time; the coils CLa, CLb are never driven simultaneously. With the single-phase motor of the present embodiment on the other hand, the coils CLa, CLb are driven simultaneously at phases differing by π, as shown in FIG. 19B. Thus, in the single-phase motor of the embodiment, all of the magnetic coils are excited simultaneously, rather than stopping excitation of the other magnetic coils when some of the magnetic coils are excited. As a result, it is possible to obtain a motor having better efficiency than a conventional 2-phase motor. With the single-phase motor of the embodiment, utilizing PWM control to generate a drive signal having effective voltage similar to the back electromotive force generated by the coils in the motor, the coils are driven by this drive signal, thus further improving efficiency. An advantage of using a drive signal having effective voltage similar to the back electromotive force generated by the coils in the motor is that the noise and vibration of the motor are reduced considerably.

FIG. 20 is a table showing characteristics of the conventional motor with those of the motor of the embodiment. Measurements were made using identical magnetic coils in the 2-phase motor and the 1-phase motor. Also, motor load was the same in both cases. For the 2-phase motor, measurements were made during rectangular wave driving as shown in FIG. 19B. For the 1-phase motor, measurements were made both during rectangular wave driving and sine wave driving.

The following will be apparent from the table in FIG. 20.
(1) For the conventional 2-phase motor, with rectangular wave driving at supply voltage of 12 [V], power consumption was 3.6 [W] and speed was 3220 [rpm].
(2) For the single-phase motor of the embodiment, with rectangular wave driving at supply voltage of 8 [V], power consumption was 2.35 [W] and speed was 3250 [rpm].
(3) For the single-phase motor of the embodiment, with sine wave driving (or PWM control), power consumption was 2.0 [W] and speed was 3250 [rpm].
(4) Effect of single-phase motor:
From (1) and (2) above it will be seen that, where instances of rectangular wave driving are compared, power consumption by the single-phase motor of the embodiment was 2.35 [w] versus 3.6 [W] for the conventional 2-phase motor, an improvement of (3.6−2.35)/3.6=35%.
(5) Effect of sine wave driving
From (2) and (3) above it will be seen that changing from rectangular wave driving to sine wave driving of the single-phase motor of the embodiment led to an improvement in power consumption from 2.35 [W] to 2.00 [W], an improvement of (2.35−2.00)/2.35=15 [%].
(6) Overall effect:
From (1) and (3) above it will be seen that power consumption by the single-phase motor of the embodiment under sine wave driving was 2.00 [W] versus 3.6 [W] for the conventional 2-phase motor, an improvement of (3.6−2.0)/3.6=44 [%].

While the 2-phase fan motors to date operate on the basic principle used to drive most fan motors worldwide and are employed in many electronic devices, the single-phase motor of the embodiment affords an improvement of 44 [%] in power consumption. Accordingly, the motor of the embodiment of the present invention represents a technology effective on a global scale, and can be appreciated as an excellent technology for addressing problems of the global environment.

In addition to the effect of lower power consumption than conventional 2-phase fan motors, the single-phase brushless motor of the present embodiment also has the effects of low vibration, low noise, minimal rotation irregularities, low heat emission, and long life. Specifically, the single-phase brushless motor according to the present embodiment affords low power consumption, as well as reduced vibration and noise caused by eddy current, since eddy current produced in the magnetic members is negligible. Moreover, since the magnetic poles and coils are equal in number, rotation irregularities are minimal. Furthermore, due to the low power consumption and minimal copper loss of the coils, heat emission is low as well. The lower heat emission and reduced vibration have the effect of extending the life of the motor as well.

C. OTHER CONFIGURATION EXAMPLES OF MOTOR UNIT

FIGS. 21A, 21B through 27A, 27B are sectional views depicting other exemplary configurations of the motor unit. In the drawings, parts corresponding to parts of the motor unit 100 of FIGS. 1A and 1B have been assigned identical symbols.

Figure 21A:
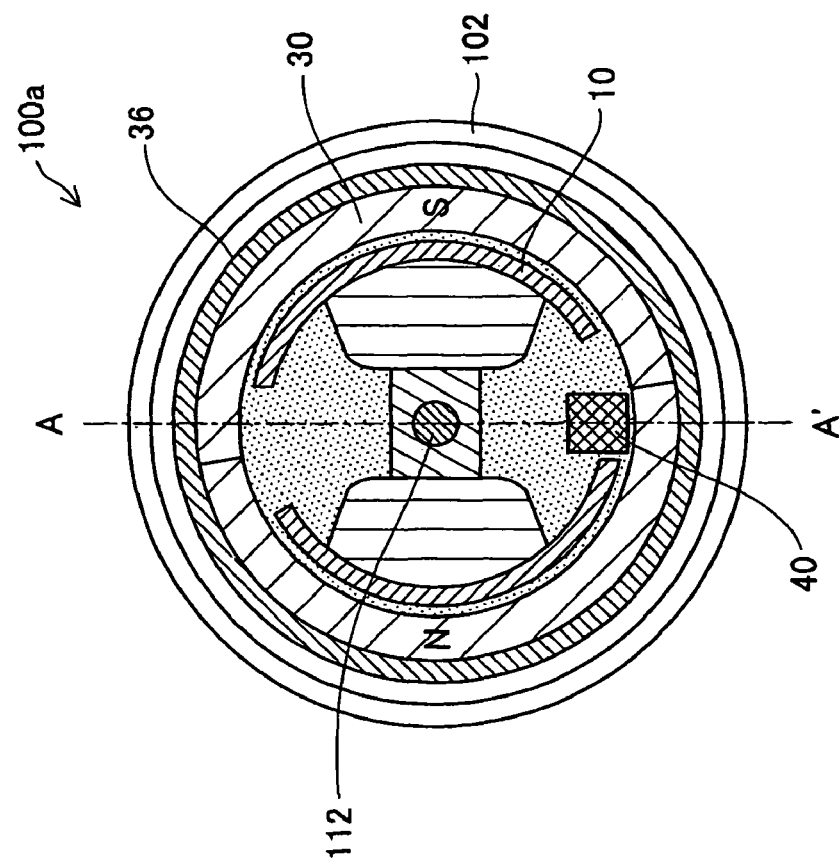
FIGS. 21A and 21B are sectional views depicting another configuration of a motor unit.
Figure 21B:
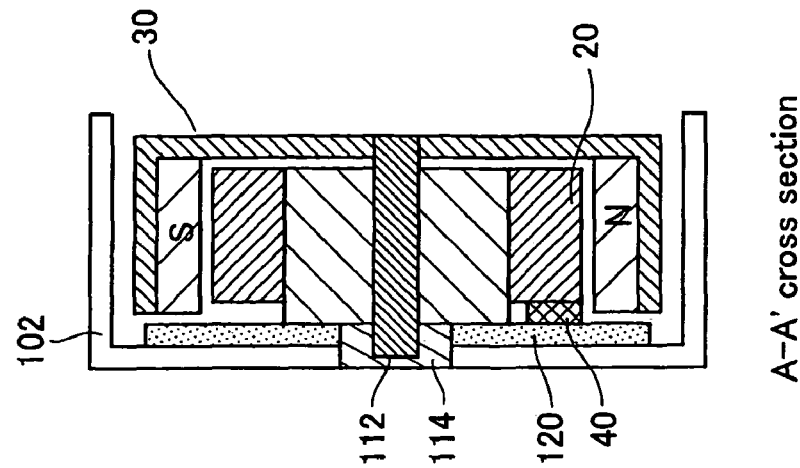
Figure 22B:
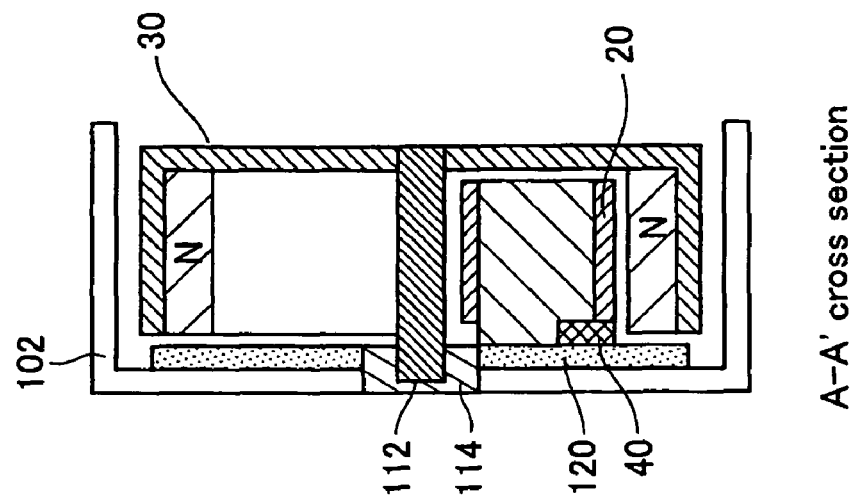
FIGS. 22A and 22B are sectional views depicting another configuration of a motor unit.
Figure 22A:
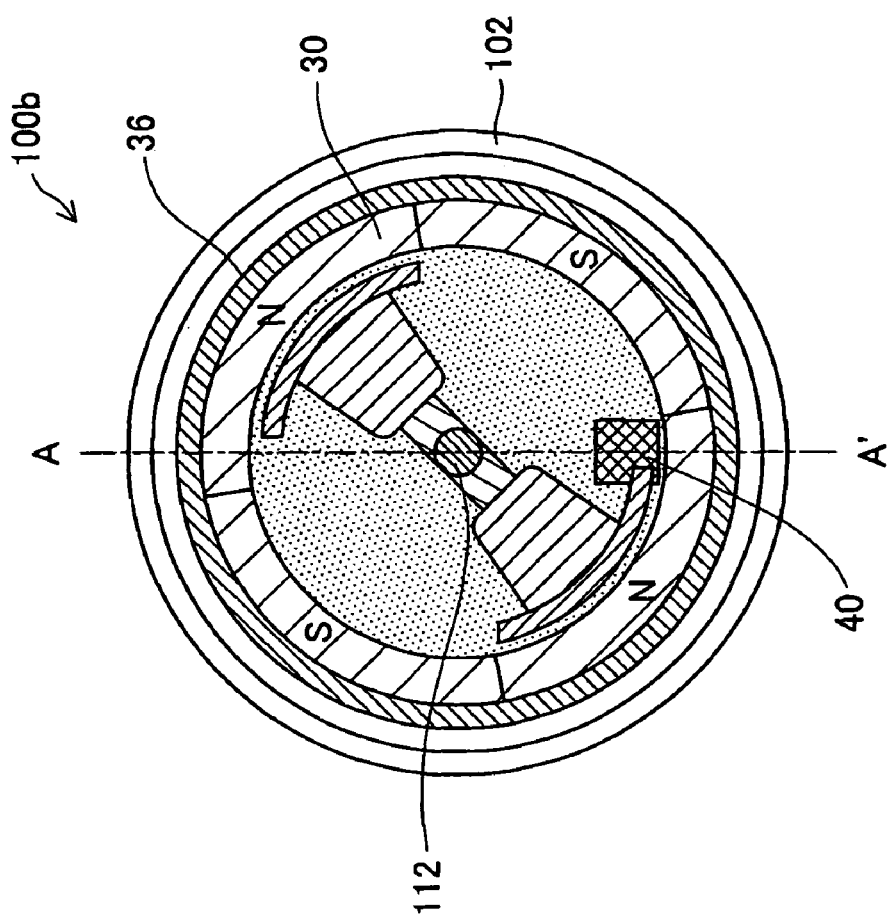
Figure 23B:
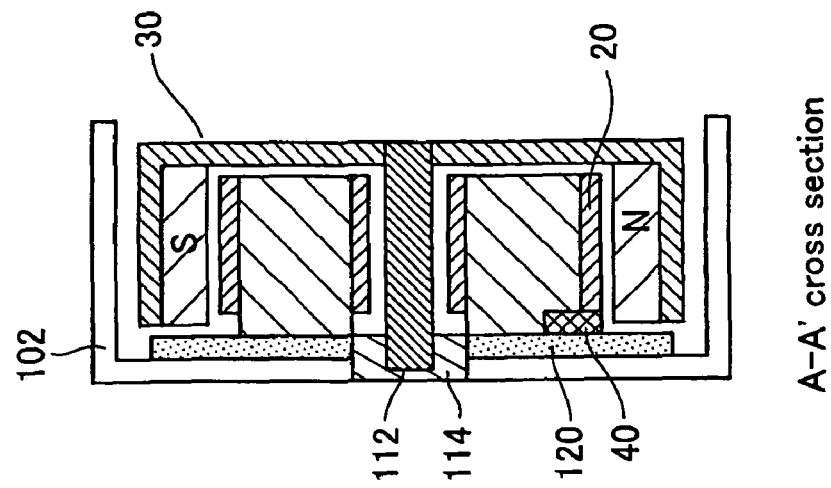
FIGS. 23A and 23B are sectional views depicting another configuration of a motor unit.
Figure 23A:
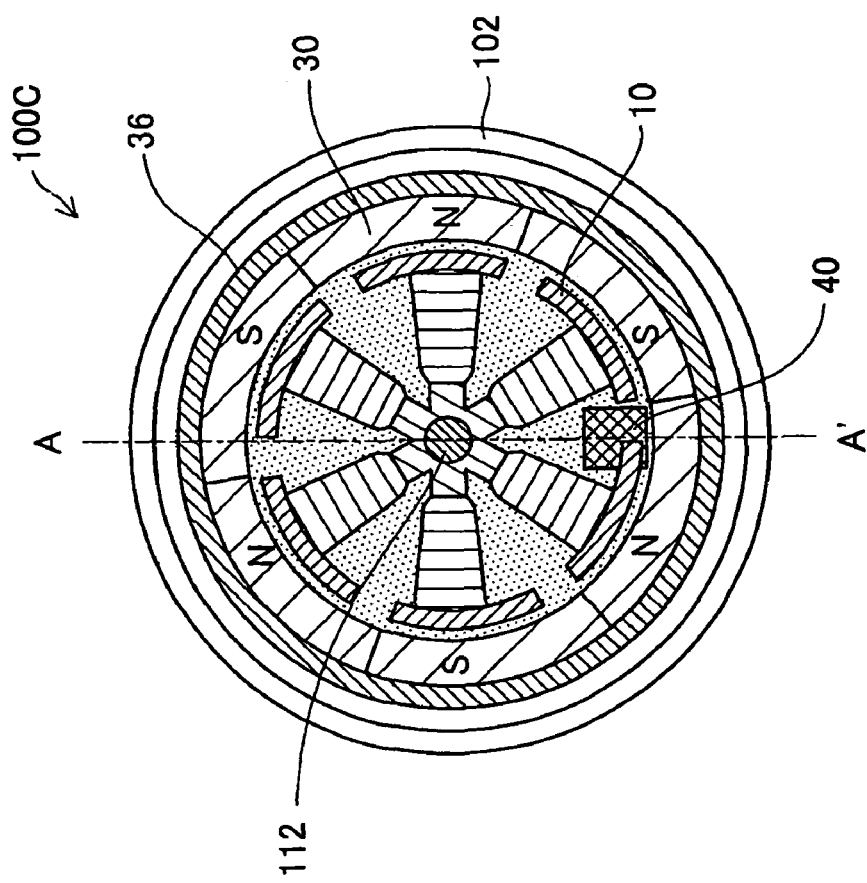

The motor unit 100a of FIGS. 21A and 21B is obtained by reducing the number of coils and magnets in the motor unit 100 of FIGS. 1A and 1B to two each, but is otherwise substantially the same with that of FIGS. 1A and 1B. The motor unit 100b of FIGS. 22A and 22B is obtained by reducing the number of coils in the motor unit 100 of FIGS. 1A and 1B to two while keeping the number of magnets at four, but is otherwise substantially the same with that of FIGS. 1A and 1B. The motor unit 100c of FIGS. 23A and 23B is obtained by increasing the number of coils and magnets in the motor unit 100 of FIGS. 1A and 1B to six each, but is otherwise substantially the same with that of FIGS. 1A and 1B. In the motor unit 100a of FIGS. 21A and 21B, the rotor portion 30 undergoes one rotation (rotation by 360 degrees) within an electrical angle of $2\pi$. In the motor unit 100b of FIGS. 22A and 22B, like that of FIGS. 1A and 1B, the rotor portion 30 undergoes rotation by 180 degrees within an electrical angle of $2\pi$. In the motor unit 100a of FIGS. 21A and 21B, the rotor portion 30 undergoes rotation by 120 degrees within an electrical angle of $2\pi$.

During reverse driving as discussed in FIGS. 5A to 5E, since reverse rotation starts' after initial normal rotation by a prescribed amount (in the case of FIGS. 5A to 5E, by an electrical angle of approximately $\pi/2$), in preferred practice the rotation angle of the rotor portion 30 during this initial normal rotation will be as small as possible. In this sense, the 4-pole motors of FIGS. 1A and 1B and FIGS. 22A and 22B are preferable to the 2-pole motor of FIGS. 21A and 21B; the 6-pole motor of FIGS. 23A and 23B will be even more preferable.

Figure 24A:
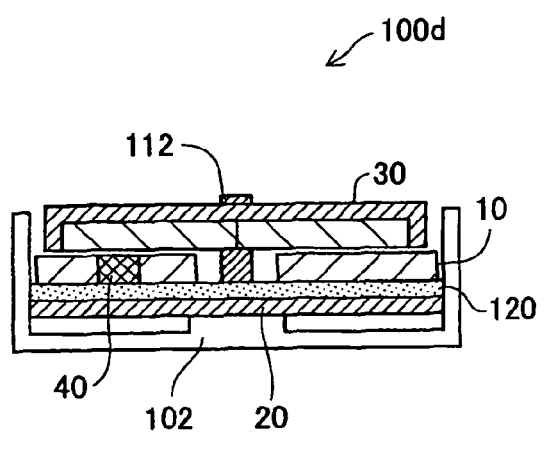
FIGS. 24A to 24D are sectional views depicting another configuration of a motor unit.
Figure 24B:
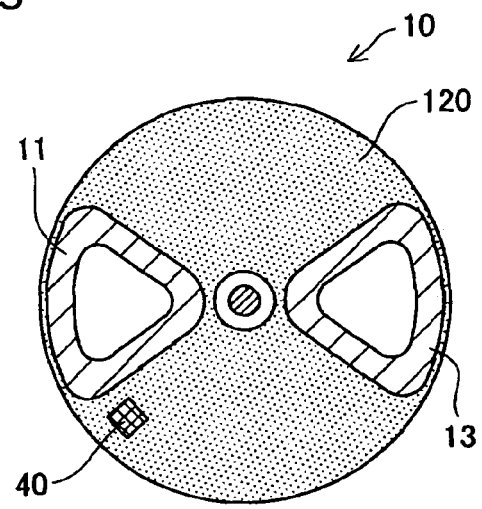
Figure 24C:
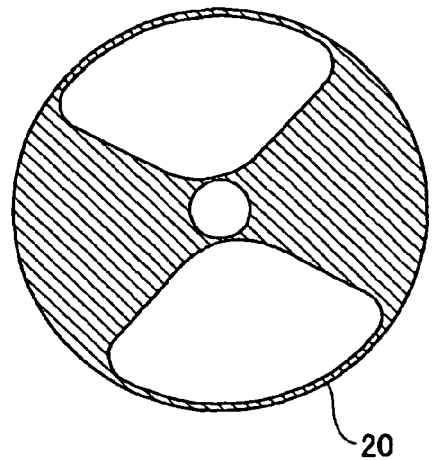
Figure 24D:
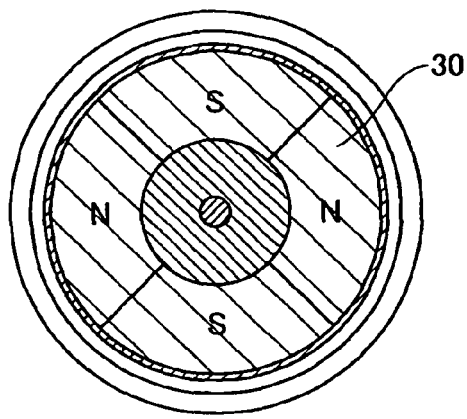

FIGS. 24A to 24D depict an example of a motor unit 100d including a stator portion 10 and a rotor portion 30 of disk shape positioned in opposition. The stator portion 10 (FIG. 24B) has two coils 11, 13 and a magnetic sensor 40 disposed on a circuit board 120. The stator portion 10 is also provided with magnetic yoke 20 (see FIGS. 24A and 24C). This magnetic yoke 20 has a magnetic member disposed at locations corresponding to the coils 11, 13, while the magnetic member is punched out at locations where coils are not located. The magnetic yoke 20 is affixed at a position slightly offset from the coils 11, 13, as shown in FIG. 24C. The rotor portion 30 (FIG. 24D) has four magnets. The magnetization direction of the magnets is perpendicular to the plane of the paper in FIG. 24D, which corresponds to the vertical direction in FIG. 24A. It is possible for this type of opposed disk motor to constitute a brushless motor embodying the present invention as well.

The motor unit 100e of FIGS. 25A to 25D is similar to the disk motor of FIGS. 24A to 24D, but with the number of coils increased to four. The motor unit 100f of FIGS. 26A to 26E is a disk motor having stator portions 10a, 10b provided respectively above and below the rotor portion 30. Each of the stator portions 10a, 10b is provided with a magnetic yoke 20 (FIG. 26B). In this example, the rotor portion 30 (FIG. 26C) has eight magnets, and each of the stator portions 10a, 10b (FIGS. 26D and 26E) has eight magnetic coils; however, other numbers may be used instead.

Figure 25A:
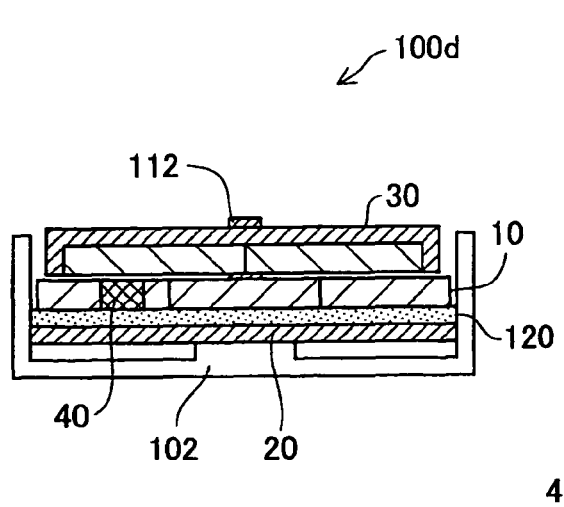
FIGS. 25A to 25D are sectional views depicting another configuration of a motor unit.
Figure 25B:
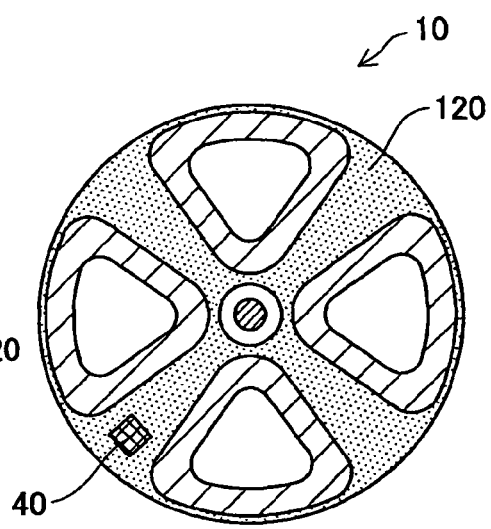
Figure 25C:
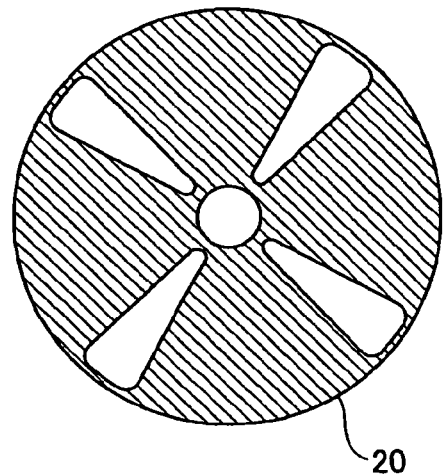
Figure 25D:
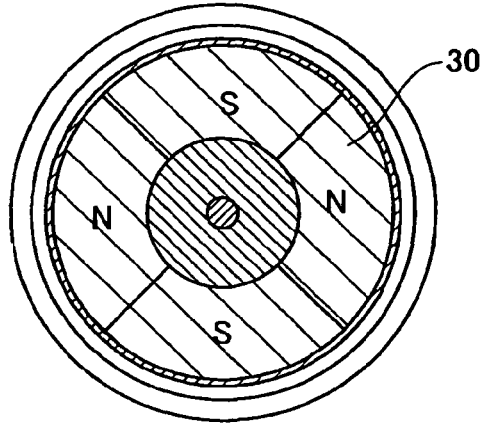
Figure 26A:
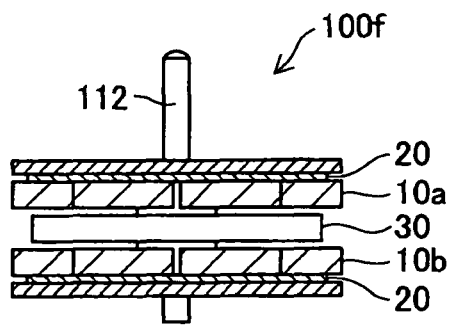
FIGS. 26A to 26E are sectional views depicting another configuration of a motor unit.
Figure 26B:
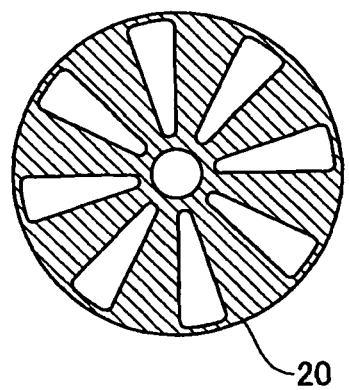
Figure 26C:
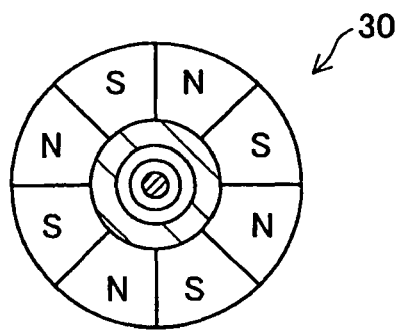
Figure 26D:
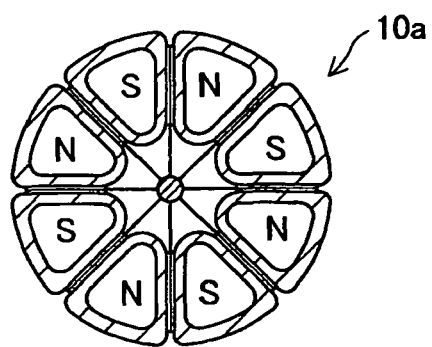
Figure 26E:
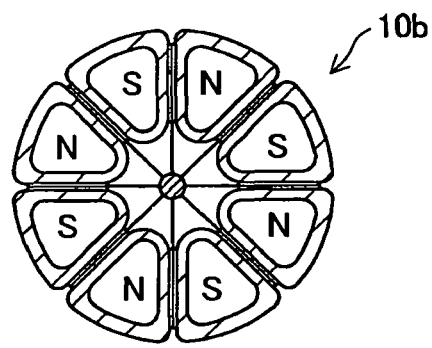

As will be apparent from the examples of FIGS. 24C, 25C, and 26B, the magnetic yoke 20 can be an integrally formed member composed of interconnected magnetic portions corresponding to the coils (the fan-shaped portions in FIGS. 24C, 25C, and 26B).

FIGS. 27A and 27B depict a linear motor configuration as yet another embodiment of the present invention. This linear motor 1000 has a stationary guide portion 1100 and a moving portion 1200. As shown in FIG. 27A, the stationary guide portion 1100 has a large number of permanent magnets 1110 arrayed along the direction of movement. The moving portion 1200 is constructed so as to sandwich the stationary guide portion 1100 in the vertical direction, and has a number of magnetic coils 1210 disposed in respectively above and below the magnet array and in opposition thereto. A magnetic sensor 40 is disposed between the magnetic coils. Each coil 1210 is furnished with a magnetic yoke 1210. As shown in FIG. 27B, the moving portion 1200 is furnished with a drive control unit 1250. The drive control unit 1250 has its own power supply (not shown), such as a fuel cell. The stationary guide portion 1100 has a rail 1120 for guiding the moving portion 1200. The moving portion 1200 is slidably supported on the rail 1120 by a bearing portion 1140. The present invention may be embodied as a linear motor of this kind as well.

In the various single-phase brushless motors illustrated in FIGS. 21A, 21B through 27A, 27B described above, the coil array is furnished with a magnetic yoke (magnetic member) whish is constructed so that the centers of the permanent magnets and the magnetic coils will be offset slightly with each other when the motor is stopped. Consequently, deadlock points will not occur, and it will be possible to start up the single-phase brushless motors without providing a starter coil. Where it is desired to operate the motor in reverse, operation in reverse can be carried out in a reliable manner by switching the polarity of the drive signal after initially driving the motor by a prescribed amount in the forward direction from the stopped state.

D. Embodiment 2

Figure 28A:
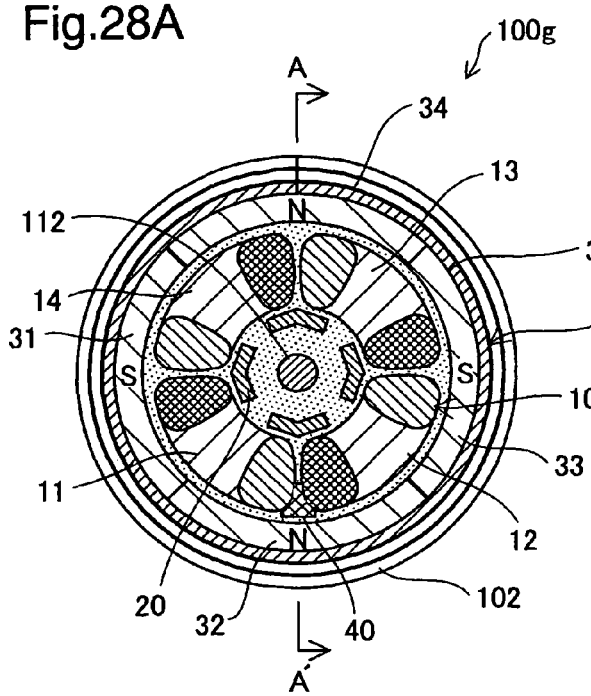
FIGS. 28A to 28D are diagrams showing the configuration of the motor unit of an electric motor in Embodiment 2.
Figure 28B:
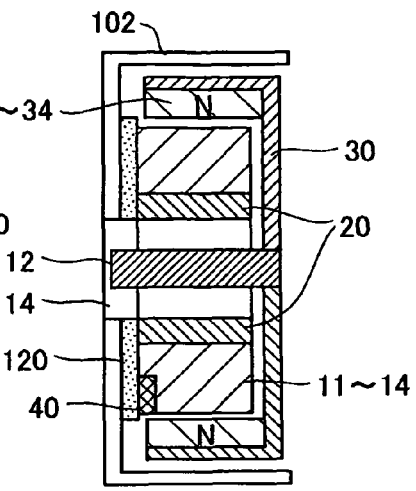

FIGS. 28A and 28B are side views depicting the configuration of the motor unit of a single-phase brushless motor pertaining to Embodiment 2 of the present invention. This motor unit 100g has a stator portion 10 and a rotor portion 30 each of generally round tubular shape. The stator portion 10 has four coils 11-14 arranged in a generally cross-shaped pattern, and a magnetic sensor 40 positioned at a center location between two of the coils 11, 12. The magnetic sensor 40 is used to detect the position of the rotor portion 30 (i.e. the phase of the motor). Magnetic yokes 20 formed of magnetic material are positioned at the inside peripheral side of the coils 11-14, at locations midway between neighboring coils. The magnetic yokes 20 are used to position the rotor portion 30 when the motor is stopped. In preferred practice positioning magnetic yokes 20 will have material, thickness, pattern of placement, etc. selected so that positioning is possible under conditions of a maximum total load including the weight of the rotor portion 30 and the maximum external load. However, if the magnetic yokes 20 are excessively large in order to enable positioning under a load exceeding the maximum total load, iron loss and cogging will be appreciable, with possibility of diminished efficiency.

Figure 28C:
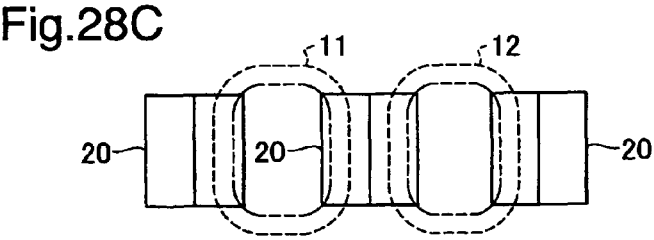
Figure 28D:
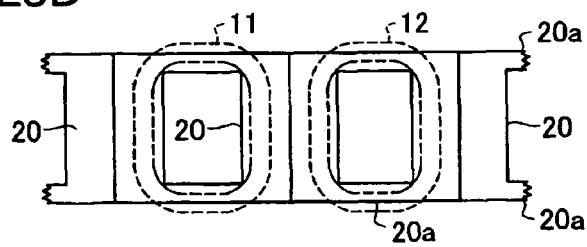

FIG. 28C is a conceptual illustration depicting exemplary shape and positional relationship of the coils and magnetic yokes 20. Here, the coils 11, 12 and magnetic yokes 20 are depicted in plan view for ease of illustration. In this example, the magnetic yokes 20 for positioning purposes are independent. In the example of FIG. 28D on the other hand, the magnetic yokes 20 are linked together by linking portions 20a at their top and bottom edges. Such an arrangement of e magnetic yokes 20 and linking portions 20a can be fabricated as a unified metal component. The linking portions 20a have the function of confining the magnetic circuit generated from the coil, and can thereby improve the efficiency of utilization of magnetic flux.

The coils 11-14, the magnetic yokes 20, and the magnetic sensor 40 are affixed onto a circuit board 120 (FIG. 28B). The circuit board 120 is affixed to a casing 102. The cover of the casing 102 is omitted in the drawing.

The rotor portion 30 has four permanent magnets 31-34; the center axis of the rotor portion 30 constitutes a rotating shaft 112. This rotating shaft 112 is supported by a shaft bearing portion 114 (FIG. 28B). The direction of magnetization of the magnets extends in a direction radially outward from the rotating shaft 112. A magnetic yoke 36 is disposed to the outside of the magnets 31-34. However, this magnetic yoke 36 may be omitted.

Figure 29A:
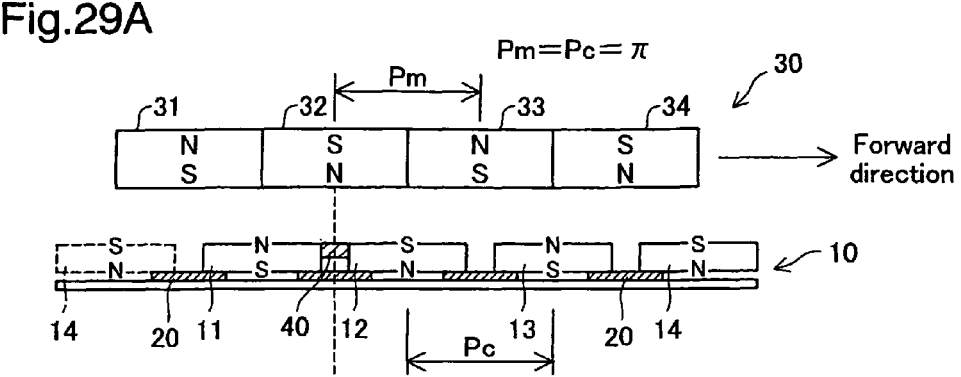
FIGS. 29A to 29C illustrate the positional relationship of a magnet array and a coil array, and the relationship of magnetic sensor output to back electromotive force waveform.
Figure 29B:
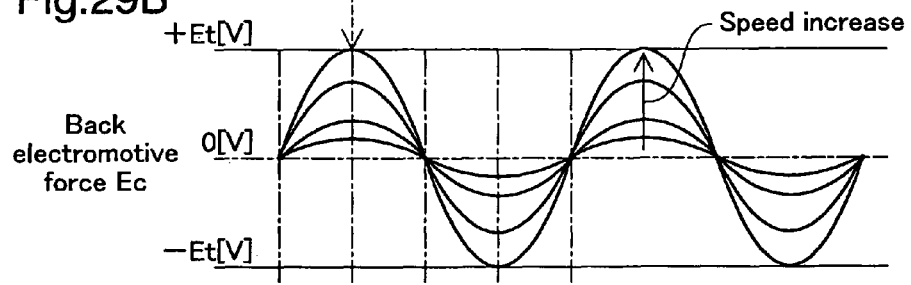
Figure 29C:
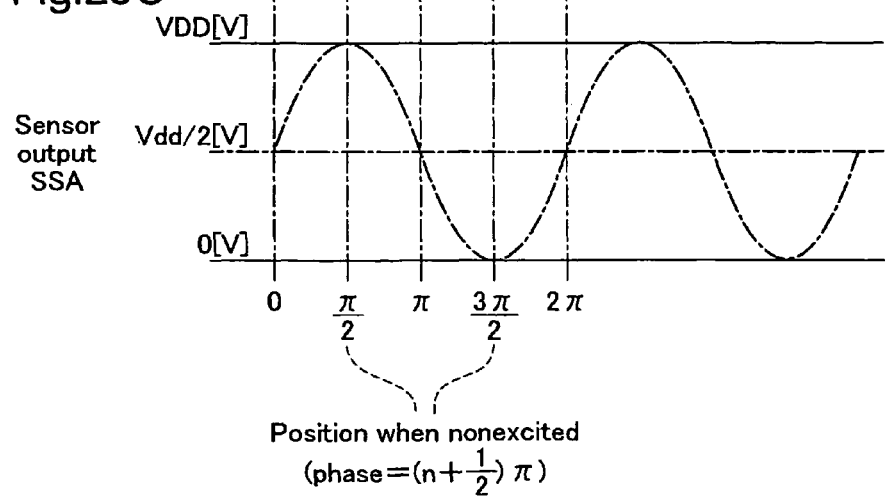

FIGS. 29A to 29C illustrate the positional relationship of a magnet array and a coil array, and the relationship of magnetic sensor output to back electromotive force waveform. As shown in FIG. 29A, the four magnets 31-34 are arranged at constant magnetic pole pitch Pm, with adjacent magnets being magnetized in opposite directions. The coils 11-14 are arranged at constant pitch Pc, with adjacent coils being excited in opposite directions. In this example, the magnetic pole pitch Pm is equal to the coil pitch Pc, and is equivalent to $\pi$ in terms of electrical angle. An electrical angle of $2\pi$ is associated with the mechanical angle or distance of displacement when the phase of the drive signal changes by $2\pi$. In the present embodiment, when the phase of the drive signal changes by $2\pi$, the rotor portion 30 undergoes displacement by the equivalent of twice the magnetic pole pitch Pm.

Of the four coils 11-14, the first and third coils 11, 13 are driven by drive signals of identical phase, while the second and fourth coils 12, 14 are driven by drive signals whose phase is shifted by 180 degrees ($=\pi$) from the drive signals of the first and third coils 11, 13. In ordinary two-phase driving, the phases of the drive signals of the two phases (Phase A and Phase B) would be shifted by 90 degrees ($=\pi/2$); in no instance would they be shifted by 180 degrees ($=\pi$). Also, in most motor drive methods, two drive signals phase-shifted by 180 degrees ($=\pi$) would be viewed as having identical phase. Consequently, the drive method of the motor in the present embodiment can be though of as single-phase driving.

FIG. 29A shows the positional relationship of the magnets 31-34 and the coils 11-14, with the motor at a stop. In the motor of this embodiment, the magnetic yokes 20 provided to the stator portion 10 are positioned midway between the coils. Consequently, when the motor stops, the magnetic yokes 20 will be attracted by the magnets 31-34, bringing the rotor portion 30 to a halt at a position with the magnetic yokes 20 facing the centers of the magnets 31-34. As a result, the motor will come to a halt at a position with the center of each coil 11-14 positioned midway between neighboring magnets. At this time the magnetic sensor 40 will be situated at a position facing one of the magnets 31-34. The phase at this stop location is typically $(n+\frac{1}{2})\pi$ where n is any integer.

FIG. 29B shows an example of waveform of back electromotive force generated by the coils; FIG. 29C shows an example of output waveform by the magnetic sensor 40. The magnetic sensor 40 is able to generate a sensor output SSA substantially similar in shape to the back electromotive force of the coils during motor operation. However, the output SSA of the magnetic sensor 40 has a non-zero value even when the motor is stopped, except in the case where the phase is an integral multiple of $\pi$. The back electromotive force of the coils tends to increase together with motor speed, but the shape of the waveform (sine wave) remains substantially similar. A Hall IC that utilizes the Hall effect may be employed as the magnetic sensor 40. In this example, the sensor output SSA and the back electromotive force Ec are both sine wave waveforms or waveforms approximating a sine wave. As described before, the drive control circuitry of this motor utilizes the sensor output SSA to apply to the coils 11-14 voltage of waveform substantially similar in shape to the back electromotive force Ec.

Figure 30A:
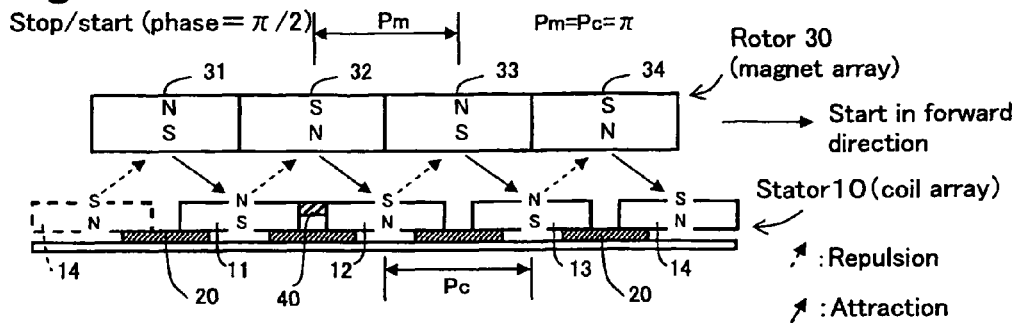
FIGS. 30A to 30D illustrate normal rotation of the motor.

FIGS. 30A to 30E illustrate normal rotation of the motor unit 100g. FIG. 30A is the same as FIG. 29A, and depicts the positional relationships of the magnets 31-34 and the coils 11-14 at a stop. In the state depicted in FIG. 30A, excitation of the coils 11-14 produces between the coils 11-14 and the magnets 31-34 forces of repulsion in the direction indicated by the broken arrows and forces of attraction in the direction indicated by the solid arrows. As a result, the rotor portion 30 begins to move in the direction of normal rotation (rightward in the drawing).

Figure 30B:
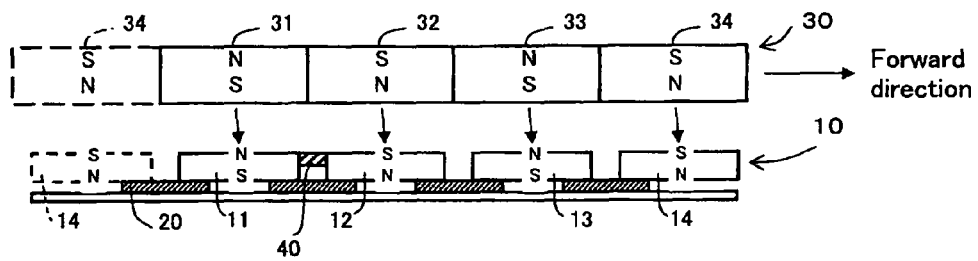
Figure 30C:
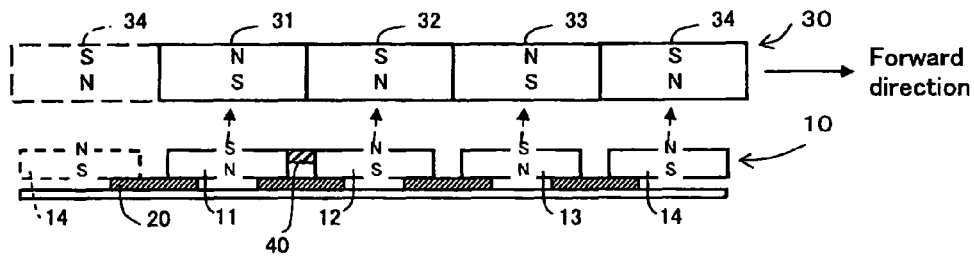
Figure 30D:
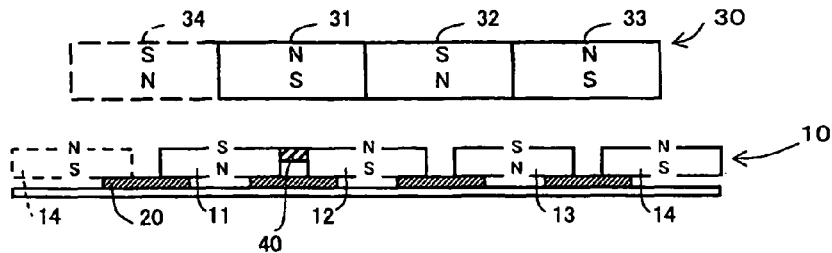

FIG. 30B depicts a state in which the phase has advanced to just before $\pi$. The coil excitation direction reverses coincident with the timing of the phase going to $\pi$, resulting in the state shown in FIG. 30C. FIG. 30D depicts the state in which the phase has advanced further to $3\pi/2$. If the motor stops in proximity to this position, the magnetic yokes 20 will be attracted towards the magnets 31-34, and the rotor portion 30 will come to stop at a position with the magnetic yokes 20 facing the magnets 31-34. This position is typically the $(n+\frac{1}{2})\pi$ phase position where n is an integer. As shown in FIG. 29B discussed previously, the $(n+\frac{1}{2})\pi$ phase position corresponds to the position of peak back electromotive force generated by the magnetic coils 11-14.

With the motor at a halt, it is possible to reverse the motor by applying to the magnetic coils 11-14 electrical current in the opposite direction from that during forward rotation. The reason that the motor can be reversed simply by reversing the current direction is because the stop position of the motor coincides with the position of peak back electromotive force, as shown in FIG. 29B. Specifically, at the position of peak back electromotive force, energy conversion efficiency is high and the motor can be driven with maximum efficiency. Consequently, by applying electrical current in either the forward rotation direction or reverse rotation direction to the coils, it is possible to easily operate the motor from a stop in either the forward or reverse direction, without a deadlock point occurring.

In this way, with the motor of the present embodiment, the motor will come to a stop at a phase position of $(n+\frac{1}{2})\pi$ where n is an integer, and thus deadlock points will be avoided. Accordingly, startup will always be possible without the need for a startup coil. Moreover, with the motor of the embodiment, it is possible to accomplish either forward operation or reverse operation from a stop.

E. MODIFICATION EXAMPLES

The present invention is not limited to the embodiments described hereinabove, and may be reduced to practice in various other ways without departing from the spirit thereof. Modifications such as the following would be possible, for example.

E1. Modification Example 1

In the preceding embodiments, the magnetic members or magnetic yokes 20 are provided for each individual coil, but the coil array may instead be furnished with magnetic members differing in number from the number of coils. In this case, the magnetic members will preferably be arranged in such a way that, with the single-phase brushless motor at a stop, the magnetic members will be attracted by the magnet array and thereby bring the motor to a halt at a position with the centers of the permanent magnets offsetted from the centers of the magnetic coils. However, an advantage of providing a magnetic member for each coil is the ease of achieving weight balance of the magnet array as a whole.

E2. Modification Example 2

While analog magnetic sensors are employed in the preceding embodiments, it is possible to use digital magnetic sensors having multivalue analog output, instead of analog magnetic sensors. Both an analog magnetic sensor and a digital magnetic sensor with multivalue analog output will have an output signal exhibiting analog variation. Herein, an "output signal exhibiting analog variation" refers in the broad sense to include both analog output signals, and multilevel digital output signals having three or more levels, not On/Off binary output.

It is also acceptable to use a digital magnetic sensor with binary digital output, instead of a sensor with an output signal exhibiting analog variation. In this case, the ADC 570 and the excitation interval setting unit 590 of FIG. 12A will not be necessary. Consequently, while the failure to set the excitation interval and to use a sine wave drive waveform will result in lower efficiency and the occurrence of noise/vibration, it will be possible to realize the drive control circuit by an inexpensive IC.

E3. Modification Example 3

It is possible to employ as the PWM circuit various circuit configurations besides that shown in FIG. 12A For example, it is possible to use a circuit that performs PWM control by comparing a sensor output with a triangular reference wave. It is also possible to employ a circuit that generates drive signals by some method besides PWM control. For example, a circuit that amplifies sensor output and generates an analog drive signal may be used.

In FIG. 12A, the ADC 570 may be replaced with a voltage comparator. In this case, the drive waveform will be rectangular rather than a sine wave drive waveform, and thus noise/vibration will occur, but it will be possible to realize the drive control circuit by an inexpensive IC.

E4. Modification Example 4

The present invention is applicable to motors and devices of various kinds such as fan motors, clocks for driving the clock hands, drum type washing machines with single rotation, jet coasters, and vibrating motors. Where the present invention is implemented in a fan motor, the various advantages mentioned previously (low power consumption, low vibration, low noise, minimal rotation irregularities, low heat emission, and long life) will be particularly notable. Such fan motors may be employed, for example, as fan motors for digital display devices, vehicle on-board devices, fuel cell equipped apparatuses such as fuel cell equipped personal computers, fuel cell equipped digital cameras, fuel cell equipped video cameras and fuel cell equipped mobile phones, projectors, and various other devices. The motor of the present invention may also be utilized as a motor for various types of household electric appliances and electronic devices. For example, a motor in accordance with the present invention may be employed as a spindle motor in an optical storage device, magnetic storage device, and polygon mirror drive.

Figure 31:
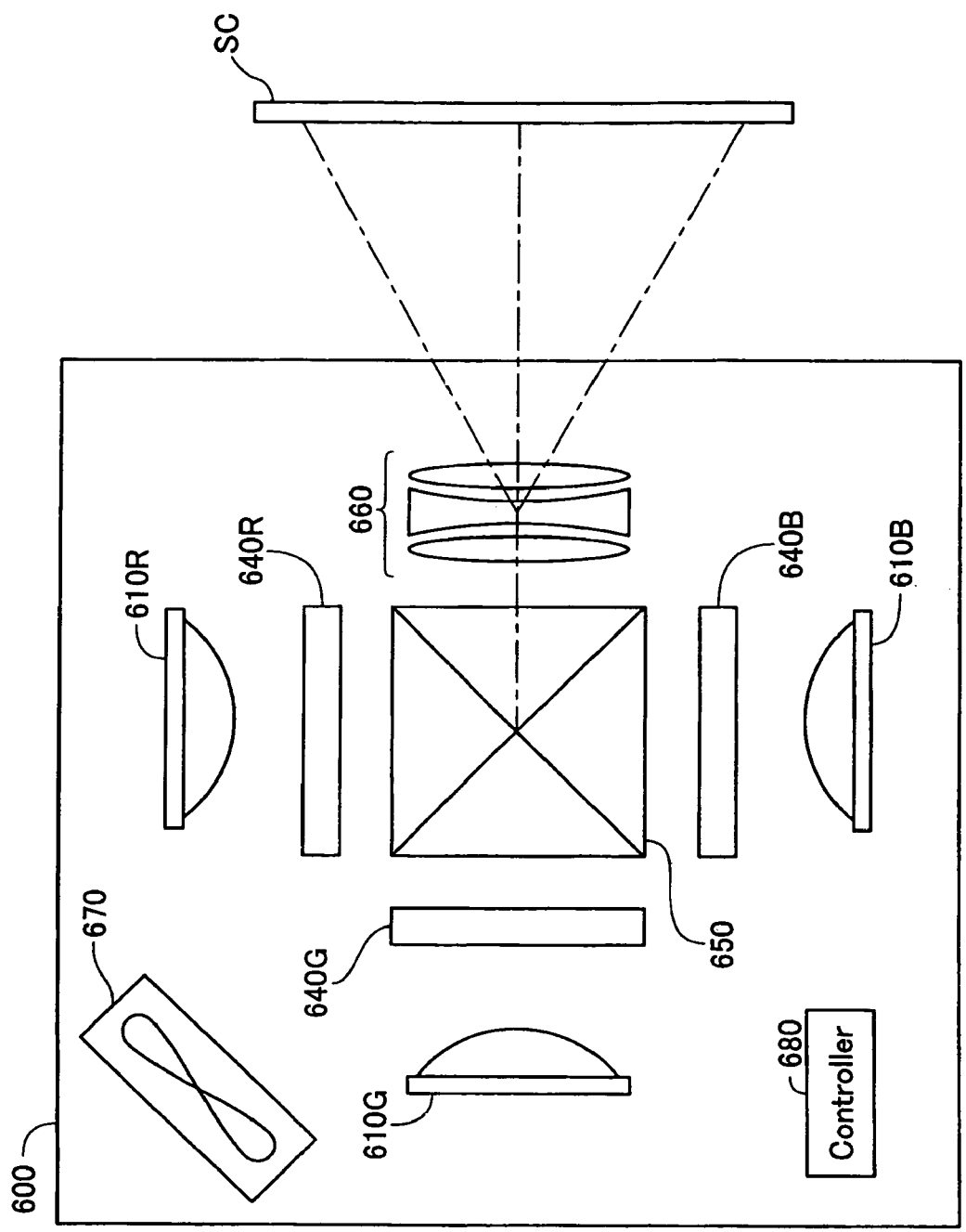
FIG. 31 illustrates a projector utilizing a motor according to the present invention.

FIG. 31 illustrates a projector utilizing a motor according to the present invention. The projector 600 includes three light sources 610R, 610G, 610B for emitting three colored lights of red, green and blue, three liquid crystal light valves 640R, 640G, 640B for modulating the three colored lights, a cross dichroic prism 650 for combining the modulated three colored lights, a projection lens system 660 for projecting the combined colored light toward a screen SC, a cooling fan 670 for cooling the interior of the projector, and a controller 680 for controlling the overall projector 600. Various rotation type brushless motors described above can be used as the motor for driving the cooling fan 670.

Figure 32A:
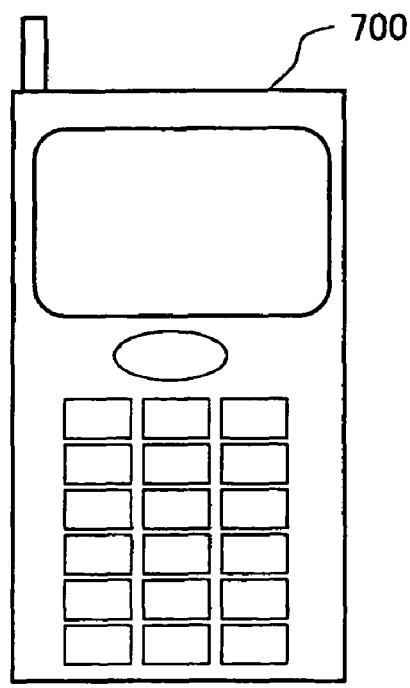
FIGS. 32A to 32C illustrate a mobile phone utilizing a motor according to the present invention.
Figure 32B:
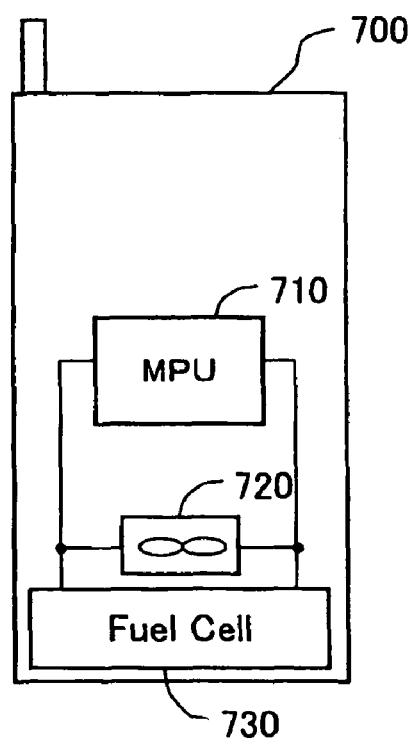
Figure 32C:
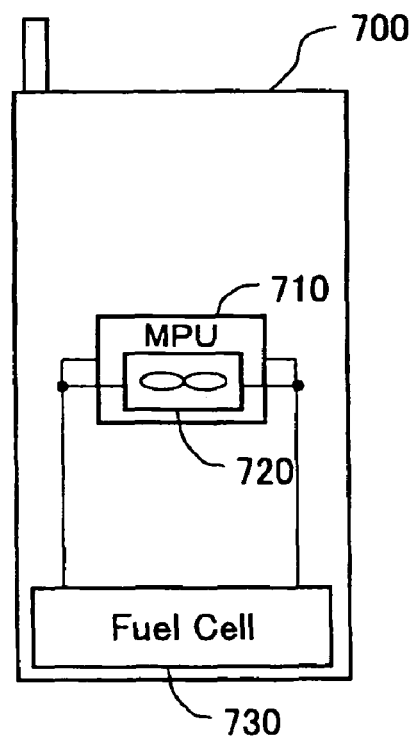

FIGS. 32A to 32C illustrate a mobile phone utilizing a motor according to the present invention. FIG. 32A shows the external view of a mobile phone 700, and FIG. 32B shows its exemplary internal configuration. The mobile phone 700 includes a MPU 710 for controlling the operation of the mobile phone 700, a fan 720, and a fuel cell 730. The fuel cell 730 supplies power to the MPU 710 and the fan 720. The fan 720 is installed in order to introduce air into the interior of the mobile phone 700 to supply the air to the fuel cell 730, or to exhaust the interior of the mobile phone 700 of water which will be produced by the fuel cell 730. The fan 720 may be installed over the MPU 710, as illustrated in FIG. 32C, to cool the MPU 710. Various rotation type brushless motors described above can be used as the motor for driving the fan 720.

The invention claimed is:

1. A single-phase brushless motor, comprising:
at least one magnetic coil;
at least one permanent magnet;
a magnetic sensor for detecting a relative position of the permanent magnet and the magnetic coil; and
a drive control circuit configured to, utilizing an output signal of the magnetic sensor, generate an application voltage for use in a single-phase drive signal of the magnetic coil;
wherein the magnetic coil comprises a magnetic member, and
the magnetic member is constituted such that, with the single-phase brushless motor at a stop, a center of the permanent magnet comes to a stop at a location offset from a center of the magnetic coil, due to attraction of the magnetic member by the permanent magnet,
wherein
if a rotor of the single-phase brushless motor is to be rotated in a first rotational direction after startup, the drive control circuit causes the rotor to rotate in a second rotational direction by a predetermined amount after the startup, and then reverses the rotation of the rotor to initiate the rotation in the first rotational direction, and
if the rotor of the single-phase brushless motor is to be rotated in the second rotational direction after startup, the drive control circuit causes the rotor to initiate the rotation in the second rotational direction without causing the rotor to rotate in the first rotational direction.

2. The single-phase brushless motor according to claim 1, wherein
the magnetic member is provided for the magnetic coil, and
at least part of the magnetic member is positioned between the magnetic coil and the permanent magnet with the single-phase brushless motor at a halt.

3. The single-phase brushless motor according to claim 2, wherein
the magnetic member includes a core portion functioning as a core of the magnetic coil.

4. The single-phase brushless motor according to claim 1, wherein
the magnetic sensor is a sensor that outputs the output signal exhibiting analog variation according to relative position of the permanent magnet and the magnetic coil.

5. The single-phase brushless motor according to claim 4, wherein
the magnetic sensor is disposed at a location such that the output signal of the magnetic sensor is a signal having a waveform similar to a back electromotive force induced in the magnetic coil by movement of the permanent magnet.

6. The single-phase brushless motor according to claim 4, wherein
the drive control circuit includes a PWM control circuit that generates the single-phase drive signal by executing PWM control utilizing the analog variation of the output signal of the magnetic sensor.

7. The single-phase brushless motor according to claim 1, wherein
the drive control circuit includes an excitation interval setting unit that limits the single-phase drive signal such that, where a position of polarity reversal in a waveform of the back electromotive force induced in the magnetic coil through movement of the permanent magnet is designated as a $\pi$ phase point, voltage is applied to the magnetic coil during excitation intervals symmetric about a $\pi/2$ phase point, and voltage is applied to the magnetic coil during non-excitation intervals symmetric about the $\pi$ phase point of the waveform of the back electromotive force, and
the excitation interval setting unit is able to vary division between the excitation intervals and the non-excitation intervals.

8. The single-phase brushless motor according to claim 1, wherein
the number of coils equals the number of magnetic poles of the magnet.

9. An electronic device, comprising:
a single-phase brushless motor; and
a driven member driven by the single-phase brushless motor,
wherein the single-phase brushless motor includes:
at least one magnetic coil;
at least one permanent magnet;
a magnetic sensor for detecting a relative position of the permanent magnet and the magnetic coil; and
a drive control circuit configured to, utilizing an output signal of the magnetic sensor, generate an application voltage for use in a single-phase drive signal of the magnetic coil;
the magnetic member is constituted such that, with the single-phase brushless motor at a stop, a center of the permanent magnet comes to a stop at a location offset from a center of the magnetic coil, due to attraction of the magnetic member by the permanent magnet,
wherein
if a rotor of the single-phase brushless motor is to be rotated in a first rotational direction after startup, the drive control circuit causes the rotor to rotate in a second rotational direction by a predetermined amount after the startup, and then reverses the rotation of the rotor to initiate the rotation in the first rotational direction, and
if the rotor of the single-phase brushless motor is to be rotated in the second rotational direction after startup, the drive control circuit causes the rotor to initiate the rotation in the second rotational direction without causing the rotor to rotate in the first rotational direction.

10. The electronic device according to claim 9, wherein the electronic device is a projector.

11. A fuel cell equipped apparatus, comprising:
a single-phase brushless motor;
a driven member driven by the single-phase brushless motor; and
a fuel cell for supplying power to the single-phase brushless motor,
wherein the single-phase brushless motor includes:
at least one magnetic coil;
at least one permanent magnet;
a magnetic sensor for detecting a relative position of the permanent magnet and the magnetic coil; and
a drive control circuit configured to, utilizing an output signal of the magnetic sensor, generate an application voltage for use in a single-phase drive signal of the magnetic coil;
the magnetic member is constituted such that, with the single-phase brushless motor at a stop, a center of the permanent magnet comes to a stop at a location offset from a center of the magnetic coil, due to attraction of the magnetic member by the permanent magnet,
wherein
if a rotor of the single-phase brushless motor is to be rotated in a first rotational direction after startup, the drive control circuit causes the rotor to rotate in a second rotational direction by a predetermined amount after the startup, and then reverses the rotation of the rotor to initiate the rotation in the first rotational direction, and
if the rotor of the single-phase brushless motor is to be rotated in the second rotational direction after startup, the drive control circuit causes the rotor to initiate the rotation in the second rotational direction without causing the rotor to rotate in the first rotational direction.

12. A single-phase brushless motor, comprising:
at least one magnetic coil;
at least one permanent magnet;
a magnetic sensor for detecting a relative position of the permanent magnet and the magnetic coil; and
a drive control circuit configured to, utilizing an output signal of the magnetic sensor, generate an application voltage for use in single-phase drive signal of the magnetic coil;
wherein the magnetic coil comprises a magnetic member, and
the magnetic member is constituted such that, with the single-phase brushless motor at a stop, a center of the permanent magnet comes to a stop at a location offset from a center of the magnetic coil,
wherein
if a rotor of the single-phase brushless motor is to be rotated in a first rotational direction after startup, the drive control circuit causes the rotor to rotate in a second rotational direction by a predetermined amount after the startup, and then reverses the rotation of the rotor to initiate the rotation in the first rotational direction, and
if the rotor of the single-phase brushless motor is to be rotated in the second rotational direction after startup, the drive control circuit causes the rotor to initiate the rotation in the second rotational direction without causing the rotor to rotate in the first rotational direction.

13. A single-phase brushless motor, comprising:

at least one magnetic coil;

at least one permanent magnet;

a magnetic sensor for detecting a relative position of the permanent magnet and the magnetic coil; and a drive control circuit configured to, utilizing an output signal of the magnetic sensor, generate an application voltage for use in single-phase drive signal of the magnetic coil;

wherein the magnetic coil comprises a magnetic member, and when the single-phase brushless motor is at a stop, a center of the permanent magnet comes to a stop at a location offset from a center of the magnetic coil, wherein if a rotor of the single-phase brushless motor is to be rotated in a first rotational direction after startup, the drive control circuit causes the rotor to rotate in a second rotational direction by a predetermined amount after the startup, and then reverses the rotation of the rotor to initiate the rotation in the first rotational direction, and if the rotor of the single-phase brushless motor is to be rotated in the second rotational direction after startup, the drive control circuit causes the rotor to initiate the rotation in the second rotational direction without causing the rotor to rotate in the first rotational direction.

* * * * *